(12) United States Patent
Chai et al.

(10) Patent No.: US 11,429,862 B2
(45) Date of Patent: Aug. 30, 2022

(54) DYNAMIC ADAPTATION OF DEEP NEURAL NETWORKS

(71) Applicant: SRI International, Menlo Park, CA (US)

(72) Inventors: Sek Meng Chai, Princeton, NJ (US); Aswin Nadamuni Raghavan, Princeton, NJ (US); Samyak Parajuli, East Brunswick, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 936 days.

(21) Appl. No.: 16/133,446

(22) Filed: Sep. 17, 2018

(65) Prior Publication Data
US 2020/0134461 A1    Apr. 30, 2020

Related U.S. Application Data

(60) Provisional application No. 62/645,358, filed on Mar. 20, 2018.

(51) Int. Cl.
| | | |
|---|---|---|
| *G06N 3/08* | (2006.01) | |
| *G06N 3/10* | (2006.01) | |
| *G06N 3/04* | (2006.01) | |

(52) U.S. Cl.
CPC .............. *G06N 3/084* (2013.01); *G06N 3/04* (2013.01); *G06N 3/10* (2013.01)

(58) Field of Classification Search
CPC .............. G06N 3/04; G06N 3/08; G06N 3/10
See application file for complete search history.

(56) References Cited

U.S. PATENT DOCUMENTS

| | | |
|---|---|---|
| 2017/0270408 A1 | 9/2017 | Shi et al. |
| 2017/0323196 A1 | 11/2017 | Gibson et al. |

FOREIGN PATENT DOCUMENTS

| | | |
|---|---|---|
| EP | 3543917 A1 | 9/2019 |
| JP | H06-28323 A | 2/1994 |
| JP | 2017509982 A | 4/2017 |

(Continued)

OTHER PUBLICATIONS

Zhou, Yiren, et al. "Adaptive Quantization for Deep Neural Network." arXiv preprint arXiv:1712.01048 (Dec. 2017). (Year: 2017).*

(Continued)

*Primary Examiner* — Benjamin P Geib
(74) *Attorney, Agent, or Firm* — Shumaker & Sieffert, P.A.

(57) ABSTRACT

Techniques are disclosed for training a deep neural network (DNN) for reduced computational resource requirements. A computing system includes a memory for storing a set of weights of the DNN. The DNN includes a plurality of layers. For each layer of the plurality of layers, the set of weights includes weights of the layer and a set of bit precision values includes a bit precision value of the layer. The weights of the layer are represented in the memory using values having bit precisions equal to the bit precision value of the layer. The weights of the layer are associated with inputs to neurons of the layer. Additionally, the computing system includes processing circuitry for executing a machine learning system configured to train the DNN. Training the DNN comprises optimizing the set of weights and the set of bit precision values.

36 Claims, 13 Drawing Sheets

(56) References Cited

FOREIGN PATENT DOCUMENTS

| | | |
|---|---|---|
| JP | 2018010618 A | 1/2018 |
| WO | 2015178977 A2 | 11/2015 |

OTHER PUBLICATIONS

Zhou, Aojun, et al. "Incremental network quantization: Towards lossless cnns with low-precision weights." arXiv preprint arXiv:1702.03044 (Aug. 2017). (Year: 2017).*

Raghavan, Aswin, et al. "Bitnet: Bit-regularized deep neural networks." arXiv preprint arXiv:1708.04788 (Aug. 2017). (Year: 2017).*

Notice of Reasons for Rejection, and translation thereof, from counterpart Japanese Application No. 2019-051636, dated Jul. 14, 2020, 7 pp.

Hirose et al., "Reduction in Amount of Memory of Deep Neural Networks by Logarithmic Quantization," The Institute of Electronics, Information and Communication Engineers, IEICE Technical Report, vol. 117, No. 45, 39-44, Jun. 9, 2017, 28 pp.

Chai et al., "Multi-Precision Deep Neural Networks," Submitted to PRISM Workshop, Jun. 2017, 2 pp.

Courbarlaux et al., BinaryConnect: Training Deep Neural Networks with binary weights during propagations, NIPS'15 Proceedings of the 28th International Conference on Neural Information Processing Systems, vol. 2, Apr. 2016, 9 pp.

Duchi et al., "Adaptive Subgradient Methods for Online Learning and Stochastic Optimization," Journal of Machine Learning Research, vol. 12, Jul. 2011, 39 pp.

Han et al., "Deep Compression: Compressing Deep Neural Networks With Pruning, Trained Quantization and Huffman Coding," Published as a conference paper at ICLR 2016 (oral), Feb. 2016, 14 pp.

Kim et al., NeuroCube: A Programmable Digital Neuromorphic Architecture with High-Density 3D Memory, Gigascale Reliable Energy Efficient Nanosystem (GREEN) Lab, School of Electrical and Computer Engineering, Georgia Tech, Section 6-2, 2016 CM/IEEE 43rd Annual International Symposium on Computer Architecture (ISA), Jun. 18-22, 2016, 36 pp.

Li et al., "Modout: Learning to Fuse Modalities via Stochastic Regularization," Journal of Computational Vision and Imaging Systems, vol. 2, No. 1, Oct. 2016, 3 pp.

Mathew et al., "Computer Architecture Design using Deep Temporal Models," 2018 1st Workshop on Energy Efficient Machine Learning and Cognitive Computing for Embedded Applications (EMC2), Mar. 25, 2018, 5 pp.

Miyashita et al., "Convolutional Neural Networks using Logarithmic Data Representation," Neural and Evolutionary Computing, Mar. 2016, 10 pp.

Raghavan et al., "Bit-Regularized Optimization of Neural Nets," Under review as a conference paper at ICLR 2018, Nov. 16, 2018, 11 pp.

Raghavan et al., "GPU Activity Prediction using Representation Learning," Proceedings of the 33rd Inernational Conference on Machine Learning, Mar. 27, 2017, 5 pp.

Ramachandram et al., "Bayesian Optimization on Graph-Structured Search Spaces: Optimizing Deep Multimodal Fusion Architectures," Manuscript only, Submitted to Neurocomputing, Feb. 21, 2018, 3 pp.

Srivastava et al., "Dropout: A Simple Way to Prevent Neural Networks from Overfitting," Journal of Machine Learning Research 15, Jun. 2014, pp. 1929-1958.

Parajuli et al., "Generalized Ternary Connect: End-to-End Learning and Compression of Multiplication-Free Deep Neural Networks," ArXiv, Nov. 2018, 8 pp.

Achterhold et al., "Variational Network Quantization," Published as a conference paper at ICLR, Feb. 2018, 18 pp.

Bengio et al., "Estimating or Propagating Gradients Through Stochastic Neurons for Conditional Computation," ArXiv, Aug. 2013, 12 pp.

Carreira-Perpinan et al., "Model Compression as Constrained Optimization, with Application to Neural Nets. Part II: Quantization," ArXiv, Jul. 13, 2017, 33 pp.

Carreira-Perpinan et al., "Model Compression as Constrained Optimization, with Application to Neural Nets. Part I: General Framework," ArXiv, Jul. 4, 2017, 23 pp.

Courbaraux et al., "BinaryConnect: Training Deep Neural Networks with Binary Weights During Propagations," Advances in Neural Information Processing Systems 28, (NIPS 2016) Apr. 2016, 9 pp.

Hinton et al., "Distilling the Knowledge in a Neural Network," ArXiv, Mar. 2015, 9 pp.

Kingma et al., "Adam: A Method for Stochastic Optimization," Published as a conference paper at ICLR, Jan. 2017, 15 pp.

Kingma et al., "Auto-Encoding Varational Bayes," ArXiv, May 2014, 14 pp.

Krizhevsky, "Learning Multiple Layers of Features from Tiny Images," Technical Report TR-2009, University of Toronto, Apr. 8, 2009, 60 pp.

Kwan et al., "Multiplierless Multilayer Feedforward Neural Network Design Suitable for Continuous Input-Output Mapping," Electronic Letters, vol. 29, No. 14, Jul. 8, 1993, 2 pp.

Lecun et al., "Gradient-Based Learning Applied to Document Recognition," Proceedings of the IEEE, vol. 86, No. 11, Nov. 1998, 47 pp.

Lin et al.,"Neural Networks with Few Multiplications," Published as a conference paper at ICLR, ArXiv, Feb. 2016, 9 pp.

Louizos et al., "Bayesian Compression for Deep Learning," 31st Conference on Neural Information Processing Systems (NIPS 2017), Nov. 2017, 11 pp.

Marchesi et al., "Fast Neural Networks Without Multipliers," IEEE Transactions on Neural Networks, vol. 4, No. 1, Jan. 1993, pp. 53-62.

Mishra et al., "Apprentice: Using Knowledge Distillation Techniques to Improve Low-Precision Network Accuracy," ArXiv, Nov. 15, 2017, 15 pp.

Mishra et al., "WRPN & Apprentice: Methods for Training and Inference using Low-Precision Numerics," ArXiv, Mar. 1, 2018, 3 pp.

Miyashita et al., "Convolutional Neural Networks using Logarithmic Data Representation," ArXiv, Mar. 17, 2016, 10 pp.

Polino et al., "Model Compression via Distillation and Quantization," Published as a conference paper at ICLR, ArXiv, Feb. 15, 2018, 21 pp.

Simonyan et al., "Very Deep Convolutional Networks For Large-Scale Image Recognition," Published as a conference paper at ICLR, ArXiv, Apr. 10, 2015, 14 pp.

Wu et al., "Training and Inference with Integers in Deep Neural Networks," Published as a conference paper at ICLR, Feb. 13, 2018, 14 pp.

Raghavan et al., "BitNet: Bit-Regularized Deep Neural Networks," ArXiv, Aug. 16, 2017, 10 pp.

Lee et al., "Lognet: Energy-Efficient Neural Networks Using Logarithmic Computation," 2017 IEEE International Conference on Acoustics, Speech and Signal Processing (ICASSP), Mar. 5-9, 2017, pp. 5900-5904.

Gish et al., "Asympotically Efficient Quantizing," IEEE Transactions on Information Theory, vol. 14, No. 5, Sep. 1968, pp. 676-683.

Grundwald et al., "Learning, Regularity and Compression," Chapter 1, Minimum Description Length, ISBN-13: 978-0-262-07281-6, 2007, 38 pp. (Applicant points out, in accordance with MPEP 609.04(a), that the year of publication, 2007, is sufficiently earlier than the effective U.S. filing date, so that the particular month of publication is not in issue.).

Grundwald et al., "MDL Model Selection," Chapter 14, Minimum Description Length, ISBN-13: 978-0-262-07281-6, 2007, 49 pp. (Applicant points out, in accordance with MPEP 609.04(a), that the year of publication, 2007, is sufficiently earlier than the effective U.S. filing date, so that the particular month of publication is not in issue.).

Response to European Office Action dated Sep. 29, 2020, from counterpart European application No. 19163921.0, filed Mar. 29, 2021, 18 pp.

(56) References Cited

OTHER PUBLICATIONS

Agustsson et al., "Soft-to-Hard Vector Quantization for End-to-End Learning Compressible Representations," Advances in Neural Information Processing Systems 30, (NIPS 2017), Dec. 4-9, 2017, 16 pp.
Anwar et al.,"Learning Separable Fixed-Point Kernels for Deep Convolutional Neural Networks," IEEE International Conference on Acoustics, Speech and Signal Processing, (ICASSP 2016), Mar. 20-25, 2016, 5 pp.
Bergstra et al., "Theano: A CPU and GPU Math Compiler in Python," Proc. of the 9th Python in Science Conc, (SCIPY 2010), Jun. 28-Jul. 3, 2010, 8 pp.
Bottou et al., "Convergence Properties of the K-Means Algorithms," Advances in neural information processing systems 7, Jul. 1995, 8 pp.
Chai et al., "Low Precision Neural Networks using Subband Decomposition," CogArch Workshop, Apr. 2016, 5 pp.
Chen et al., "Compressing Convolutional Neural Networks," Computer Vision and Pattern Recognition (cs.CV); Neural and Evolutionary Computing, submitted to Cornell University Jun. 14, 2015, arXiv: 1506:04449, 9 pp.
Chen et al., "Compressing Neural Networks with the Hashing Trick," Proceedings of the 32nd International Conference on Machine Learning, Jul. 6-11, 2015, 10 pp.
Choi et al., "Towards the Limit of Network Quantization," ICLR 2017, Computer Vision and Pattern Recognition, available from Cornell University, arXiv: 1612.010543, last revised Nov. 13, 2017, 14 pp.
Coates et al., "Deep learning with COTS HPC systems," Proceedings of the 30th International Conference on Machine Learning, Jun. 16-21, 2013, 9 pp.
Collins et al., "Memory Bounded Deep Convolutional Networks," Computer Vision and Pattern Recognition, Cornell University, arXiv:1412.1442, Dec. 3, 2014, 10 pp.
Courbariaux et al., "BinaryConnect: Training Deep Neural Networks with binary weights during propagations," Advances in Neural Information Processing Systems 28 (NIPS 2015), Dec. 7-12, 2015, 9 pp.
Denton et al., "Exploiting Linear Structure Within Convolutional Networks for Efficient Evaluation," Advances in Neural Information Processing Systems 27 (NIPS 2014), Dec. 8-11, 2014, 9 pp.
Duchi et al., "Adaptive Subgradient Methods for Online Learning and Stochastic Optimization," Journal of Machine Learning Research, published Jul. 12, 2011, 39 pp.
Gish et al., "Asymptotically Efficient Quantizing," accessed from IEEE on Nov. 28, 2008, originally published Sep. 1968, 8 pp.
Gong et al., "Compressing Deep Convolutional Networks Using Vector Quantization," ICLR, Cornell University, arXiv:1412.6115, Dec. 18, 2014, 10 pp.
Gupta et al., "Deep Learning with Limited Numerical Precision," Proceedings of the 32nd International Conference on Machine Learning, W&CP vol. 37, Jul. 7-9, 2015, 10 pp.
Han et al., "Learning both Weights and Connections for Efficient Neural Networks," Advances in Neural Information Processing Systems 28 (NIPS 2015), Dec. 7-12, 2015, 9 pp.
Hashemi et al., "Understanding the Impact of Precision Quantization on the Accuracy and Energy of Neural Networks," Design, Automation & Test in Europe Conference & Exhibition (DATE), IEEE published May 15, 2017, 6 pp.
He et al., "Deep Residual Learning for Image Recognition," IEEE Conference on Computer Vision and Pattern Recognition (CVPR), Jun. 26-Jul. 1, 2016, accessed from http://openaccess.thecvf.com/content_cvpr_2016/html/He_Deep_Residual_Learning_CVPR_2016_paper.html, 9 pp.
Hubabra et al., "Quantized Neural Networks: Training Neural Networks with Low Precision Weights and Activations," Journal of Machine Learning Research, published Apr. 2018, 30 pp.
Ioffe et al., "Batch Normalization: Accelerating Deep Network Training by Reducing Internal Covariate Shift," Cornell Univeristy arXiv:1502.03167, Feb. 11, 2015, 11 pp.
Jin et al., "Training Skinny Deep Neural Networks with Iterative Hard Thresholding Methods," Cornell University, arXiv:1607.05423, Jul. 19, 2016, 11 pp.
Judd et al., "Proteus: Exploiting Numerical Precision Variability in Deep Neural Networks," Proceedings of the 2016 International Conference on Supercomputing, Jun. 2016, Article No. 23, 6 pp.
Li et al., "Pruning Filters for Efficient Convnets," ICLR 2017, submitted Aug. 31, 2016, arXiv:1608.08710, 13 pp.
Kiaee et al., "Alternating Direction Method of Multipliers for Sparse Convolutional Neural Networks," Cornell University, arXiv:1611.01590, Nov. 5, 2016, 14 pp.
Krizhevsky et al., "ImageNet Classification with Deep Convolutional Neural Networks," Advances in Neural Information Processing Systems 25, (NIPS 2012), Dec. 3-8, 2012, 9 pp.
Lin et al., "Towards Convolutional Neural Networks Compression via Global Error Reconstruction," Proceedings of the Twenty-Fifth International Joint Conference on Artificial Intelligence (IJCAI-16), Jul. 2016, 7 pp.
Mellempudi et al., "Mixed Low-precision Deep Learning Inference using Dynamic Fixed Point," Cornell University, arXiv:1701.08978, Jan. 31, 2017, 6 pp.
Meng et al., "Two-Bit Networks for Deep Learning on Resource-Constrained Embedded Devices," Cornell University, arXiv:1701.00485, Jan. 2, 2017, 2 pp.
Merolla et al., "Deep neural networks are robust to weight binarization and other non-linear distortions," Cornell University, arXiv:1606.01981, Jun. 7, 2016, 10 pp.
Rastergari et al., "XNOR-Net: ImageNet Classification Using Binary Convolutional Neural Networks," Sep. 17, 2016, 17 pp.
Rigamonti et al., "Learning Separable Filters," IEEE Conference on Computer Vision and Pattern Recognition (CVPR), 2013, Jun. 25-27, 2013, accessed from http://openaccess.thecvf.com/content_cvpr_2013/html/Rigamonti_Learning_Separable_Filters_2013_CVPR_paper.html, 8 pp.
Shin et al., "Fixed-Point Optimization of Deep Neural Networks With Adaptive Step Size Retraining," ICASSP 2017, Cornell University, arXiv:1702.08171, Feb. 2017, 5 pp.
Sung et al., "Resiliency of Deep Neural Networks Under Quantization," ICLR 2016, Cornell University, arXiv: 1511.06488, 11 pp.
Szegedy et al., "Inception-v4, Inception-ResNet and the Impact of Residual Connections on Learning," Proceedings of the Thirty-First AAAI Conference on Artificial Intelligence (AAAI-17), Cornell Univerisity, arXiv:1602.07261, Feb. 23, 2016, 7 pp.
Tai et al., "Convolutional Neural Networks With Low-Rank Regularization," ICLR 2016, Cornell University, arXiv:1511.06067, Feb. 14, 2016, 11 pp.
Taigman et al., "DeepFace: Closing the Gap to Human-Level Performance in Face Verification," Conference on Computer Vision and Pattern Recognition (CVPR), Jun. 24, 2014, 8 pp.
Tu et al., "Reducing the Model Order of Deep Neural Networks Using Information Theory," Cornell University, arXiv:1605.04859, May 16, 2016, 6 pp.
Ullrich et al., "Soft Weight-Sharing for Neural Network Compression," ICLR 2017, Cornell University, arXiv:1702.04008, May 9, 2017, 16 pp.
Venkatesh et al., "Accelerating Deep Convolutional Networks Using Low-Precision and Sparsity," Cornell University, arXiv:1610.00324, Oct. 2, 2016, 5 pp.
Wan et al., "Regularization of Neural Networks using DropConnect," Proceedings of the 30 the International Conference on Machine Learning, W&CP vol. 28, Jun. 2013, 9 pp.
Wang et al., "Scalable Compression of Deep Neural Networks," Cornell University, arXiv:1608.07365, Aug. 26, 2016, 5 pp.
Yin et al., "Training Ternary Neural Networks with Exact Proximal Operator," ResearchGate, arXiv:1612.06052, Dec. 19, 2016, 7 pp.
Zhou et al., "Dorefa-Net: Training Low Bitwidth Convolutional Neural Networks With Low Bitwidth Gradients," Cornell University, arXiv:1606.06160, Feb. 2, 2016, 13 pp.
Zhou et al., "Less is More: Towards Compact CNNs," European Conference on Computer Vision, Sep. 17, 2016, 16 pp.
Zhu et al., "Trained Ternary Quantization," ICLR 2017, Cornell University, arXiv:1612.01064, Feb. 23, 2017, 10 pp.

(56) References Cited

OTHER PUBLICATIONS

Lee et al., "Lognet: Energy-Efficient Neural Networks Using Logarithmic Computation," IEEE Conference on Acoustics, Speech and Signal Processing, Mar. 5-9, 2017, 5 pp.

Elhoushi et al., "DeepShift: Towards Multiplication-Less Neural Networks," Cornell University, arXiv:1905.13298v2, Jun. 6, 2019, 11 pp.

Examination Report from counterpart European Application No. 19163921.0, dated Sep. 29, 2020, 10 pp.

Notice of Reasons for Rejection, and translation thereof, from counterpart Japanese Application No. 2019-051636, dated Nov. 10, 2020, 7 pp.

Extended Search Report from counterpart European Application No. 19163921.0, dated Aug. 2, 2019, 10 pp.

Response to Extended Search Report dated Aug. 2, 2019, from counterpart European Application No. 19163921.0, filed Mar. 24, 2020, 22 pp.

Gudovskiy et al., "ShiftCNN: Generalized Low-Precision Architecture for Inference of Convolutional Neural Networks," Cornell University, arXiv: 1706.02393, Jun. 7, 2017, 9 pp.

Decision of Refusal, and translation thereof, from counterpart Japanese Application No. 2019-051636, dated Sep. 7, 2021, 2 pp.

\* cited by examiner

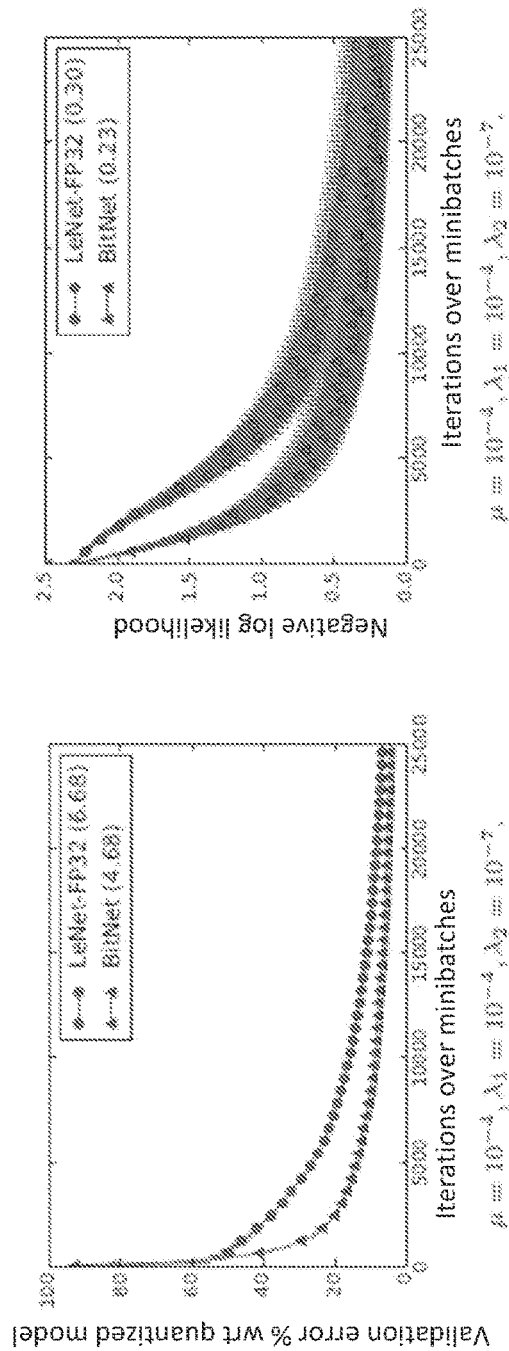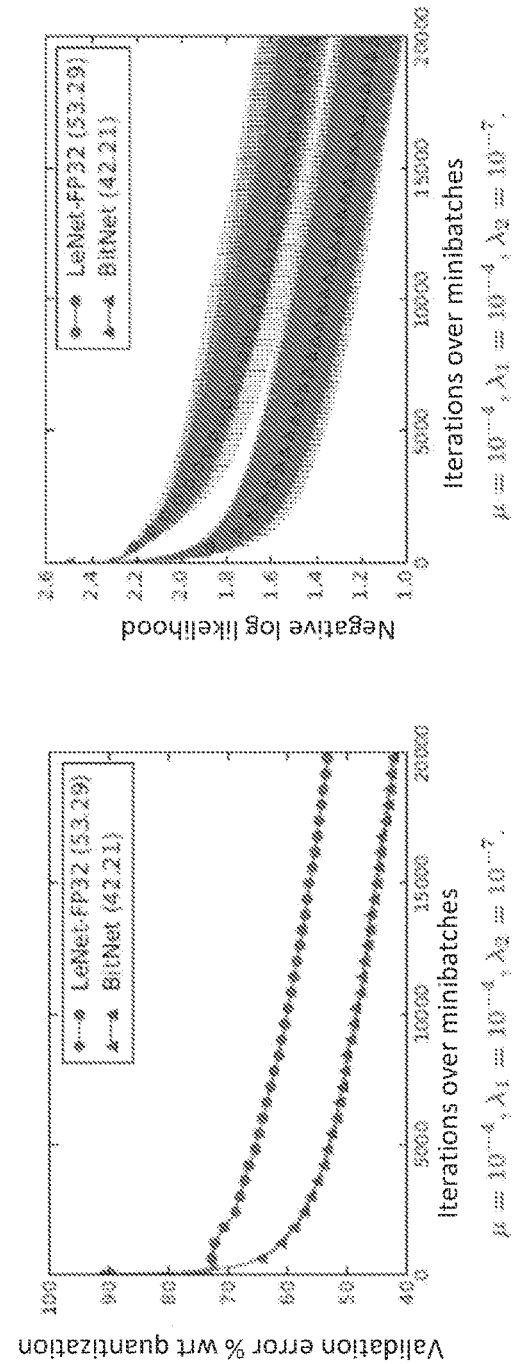
FIG. 6A
FIG. 6B

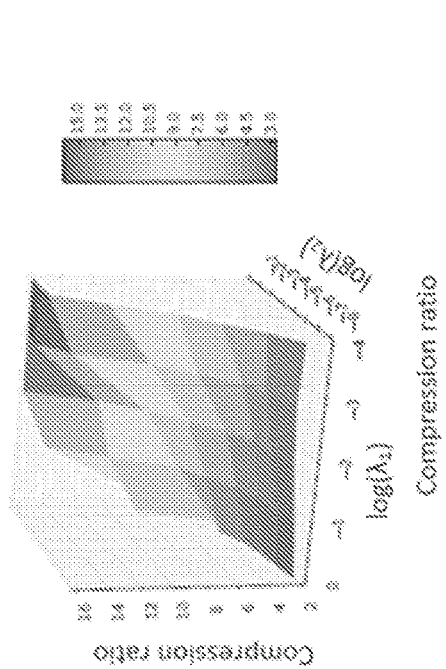
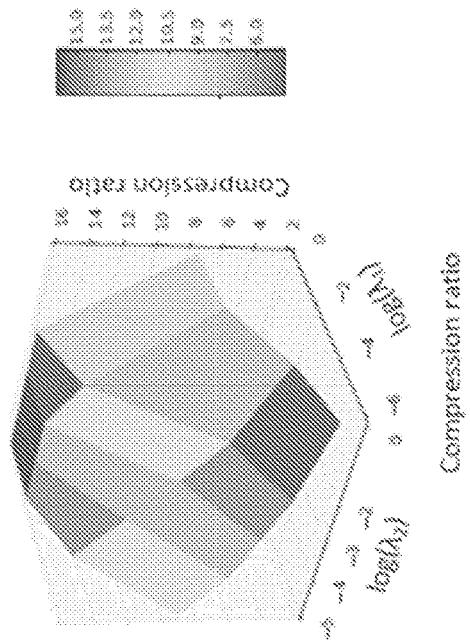
FIG. 8A
FIG. 8B
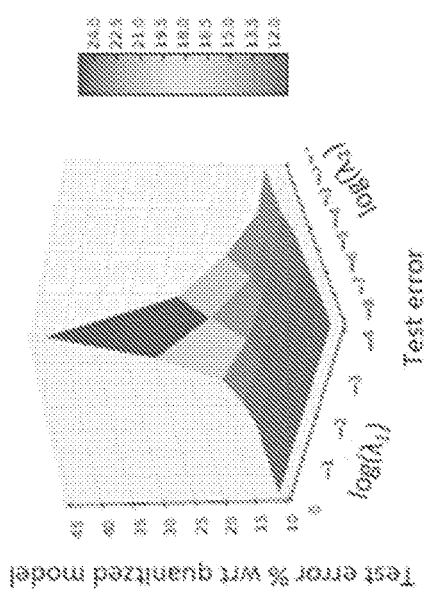
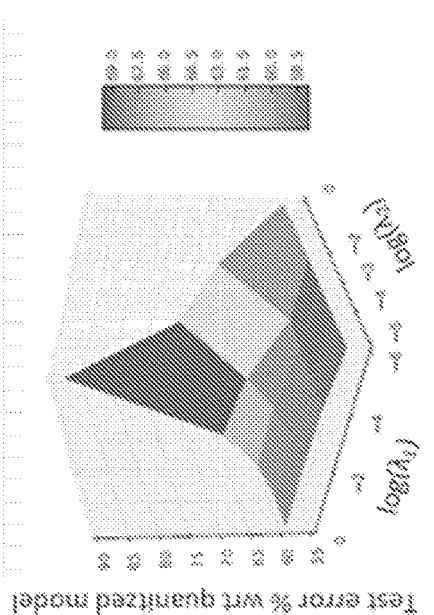

DYNAMIC ADAPTATION OF DEEP NEURAL NETWORKS

This application claims the benefit of U.S. Provisional Patent Application 62/645,358, filed Mar. 20, 2018, the entire content of which is incorporated herein by reference.

GOVERNMENT RIGHTS

This invention was made with Government support under contract no. N00014-17-C-1011 awarded by the Office of Naval Research and with support under grant no. 1526399 awarded by the National Science Foundation. The Government has certain rights in this invention.

TECHNICAL FIELD

This disclosure generally relates to machine learning systems.

BACKGROUND

Machine learning algorithms have recently made rapid progress using deep neural networks (DNNs). DNNs are artificial neural networks that have multiple hidden layers between input and output layers. Example types of DNNs include recurrent neural networks (RNNs) and convolutional neural networks (CNNs). DNNs have broad application in the fields of artificial intelligence, computer vision, automatic speech recognition, language translation, and so on. Training times, memory requirements, processor availability, battery power consumption, and energy efficiency remain challenges associated with DNNs.

SUMMARY

In general, the disclosure describes techniques related to machine learning algorithms. For example, this disclosure describes the use of low-precision methods (i.e., methods that use low-precision weights) to train deep neural networks (DNNs). For instance, this disclosure describes a training method that determines a set of precision-optimized weights for a DNN and a set of fixed-precision weights for the same DNN. The methods of training DNNs may be considered low-precision because the precision-optimized weights may have different or lower precision than the fixed-precision weights. Computing resources, such as memory storage locations, power, processing cycles, and other resources of a computer are important considerations with respect to the performance of a DNN and the suitability of the DNN for use with particular types of devices with relatively low amounts of available computing resources. Because the precision-optimized weights may have lower precision than the fixed-precision weights, the low-precision methods of this disclosure may enable lower memory and computation requirements for DNN processing. In some examples, the low-precision methods may affect microprocessor design in the sense that microprocessors with lower capabilities or computing resources may be used with the low-precision methods and in the sense that microprocessors may be designed for efficient use of precision-optimized weights.

Furthermore, the low-precision training methods may enable artificial intelligence (AI) systems that continue learning after an initial training phase. Additionally, aspects of this disclosure are related to lifelong learning methods for DNNs, and also to hardware architecture that may efficiently support both learning and inference simultaneously. Techniques of this disclosure may enable AI systems to select and configure their own learning needs (e.g., configure the bit precisions of their own weights) to meet real-time computing constraints at the edge. In some examples, techniques of this disclosure make no assumptions on the probability distribution of optimal parameters.

In one example, this disclosure describes a computing system that trains a deep neural network (DNN) for reduced computing resource requirements, the computing system comprising: a memory storing a set of weights of the DNN, the DNN including a plurality of layers, wherein for each layer of the plurality of layers, the set of weights includes weights of the layer and a set of bit precision values includes a bit precision value of the layer, the weights of the layer being represented in the memory using values having bit precisions equal to the bit precision value of the layer, the weights of the layer being associated with inputs to neurons of the layer; and processing circuitry for executing a machine learning system configured to train the DNN, wherein training the DNN comprises optimizing the set of weights and the set of bit precision values.

In another example, this disclosure describes a method of training a DNN for reduced computing resource requirements, the method comprising: storing a set of weights of the DNN and a set of bit precision values of the DNN, the DNN including a plurality of layers, wherein for each layer of the plurality of layers, the set of weights includes weights of the layer and the set of bit precision values includes a bit precision value of the layer, the weights of the layer being represented in memory using values having bit precisions equal to the bit precision value of the layer, the weights of the layer being associated with inputs to neurons of the layer; and executing a machine learning system configured to train the DNN, wherein training the DNN comprises optimizing the set of weights and the set of bit precision values.

In another example, this disclosure describes a computer-readable data storage medium having instructions stored thereon that, when executed, cause one or more processors to: store, in a memory, a set of weights of a DNN, the DNN including a plurality of layers, wherein for each layer of the plurality of layers, the set of weights includes weights of the layer and a set of bit precision values includes a bit precision value of the layer, the weights of the layer being represented in memory using values having bit precisions equal to the bit precision value of the layer, the weights of the layer being associated with inputs to neurons of the layer; and execute a machine learning system configured to train the DNN, wherein training the DNN comprises optimizing the set of weights and the set of bit precision values.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 6A and FIG. 6B illustrate example performance of BitNet and LeNet-FP32.

FIG. 8A and FIG. 8B show the impact on performance and compression on the MNIST and CIFAR-10 datasets, respectively.

Like reference characters refer to like elements throughout the figures and description.

DETAILED DESCRIPTION

Figure 1:
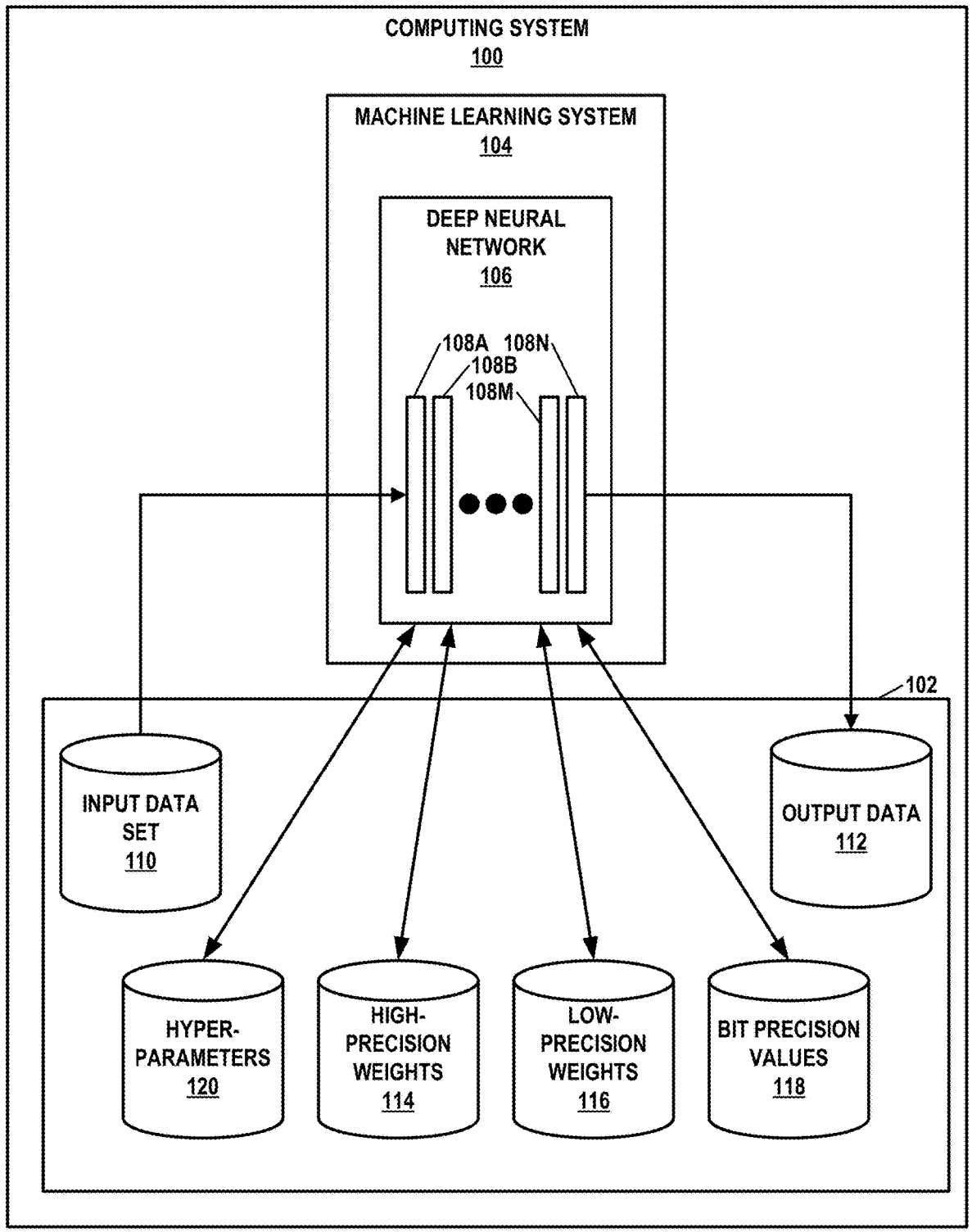
FIG. 1 is a block diagram illustrating an example computing system in accordance with the techniques of the disclosure.

FIG. 1 is a block diagram illustrating an example computing system 100. As shown, computing system 100 comprises processing circuitry for executing a machine learning system 104 having a deep neural network (DNN) 106 comprising a plurality of layers 108A through 108N (collectively, "layers 108"). DNN 106 may comprise various types of deep neural networks (DNNs), such as recursive neural networks (RNNs) and convolutional neural networks (CNNs).

In some examples, the processing circuitry of computing system 100 includes one or more of a microprocessor, a controller, a digital signal processor (DSP), an application specific integrated circuit (ASIC), a field-programmable gate array (FPGA), or equivalent discrete or integrated logic circuitry, or other types of processing circuitry. In another example, computing system 100 comprises any suitable computing system, such as desktop computers, laptop computers, gaming consoles, smart televisions, handheld devices, tablets, mobile telephones, smartphones, etc. In some examples, at least a portion of system 100 is distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In some examples, computing system 100 is implemented in circuitry, such as via one or more processors and memory 102. Memory 102 may comprise one or more storage devices. One or more components of computing system 100 (e.g., processors, memory 102, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more processors of computing system 100 may implement functionality and/or execute instructions associated with computing system 100. Examples of processors include microprocessors, application processors, display controllers, auxiliary processors, one or more sensor hubs, and any other hardware configured to function as a processor, a processing unit, or a processing device. Computing system 100 may use one or more processors to perform operations in accordance with one or more aspects of the present disclosure using software, hardware, firmware, or a mixture of hardware, software, and firmware residing in and/or executing at computing system 100. The one or more storage devices of memory 102 may be distributed among multiple devices.

Memory 102 may store information for processing during operation of computing system 100. In some examples, memory 102 comprises temporary memories, meaning that a primary purpose of the one or more storage devices of memory 102 is not long-term storage. Memory 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 102, in some examples, also include one or more computer-readable storage media. Memory 102 may be configured to store larger amounts of information than volatile memory. Memory 102 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 102 may store program instructions and/or data associated with one or more of the modules described in accordance with one or more aspects of this disclosure.

The one or more processors and memory 102 may provide an operating environment or platform for one or more modules or units, which may be implemented as software, but may in some examples include any combination of hardware, firmware, and software. The one or more processors may execute instructions and the one or more storage devices may store instructions and/or data of one or more modules. The combination of processors and memory 102 may retrieve, store, and/or execute the instructions and/or data of one or more applications, modules, or software. The processors and/or memory 102 may also be operably coupled to one or more other software and/or hardware components, including, but not limited to, one or more of the components illustrated in FIG. 1 and other figures of this disclosure.

In the example of FIG. 1, DNN 106 receives input data from an input data set 110 and generates output data 112. Input data set 110 and output data 112 may contain various types of information. For example, input data set 110 may include image data, video data, audio data, source text data, numerical data, speech data, and so on. Output data 112 may include classification data, translated text data, image classification data, robotic control data, transcription data, and so on. Furthermore, as described elsewhere in this disclosure, output data 112 may include a neural network software architecture and a mapping of DNNs in the neural network software architecture to processors of a hardware architecture.

As mentioned above, DNN 106 has a plurality of layers 108. Each of layers 108 may include a respective set of artificial neurons. Layers 108 include an input layer 108A, an output layer 108N, and one or more hidden layers (e.g., layers 108B through 108M). Layers 108 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Each input of each artificial neuron in each of layers 108 is associated with a corresponding weight in high-precision weights 114 and, in accordance with a technique of this disclosure, low-precision weights 116. The output of the k-th artificial neuron in DNN 106 may be defined as:

$$y_k \phi(W_k \cdot X_k) \quad (1)$$

In Equation (1), $y_k$ is the output of the k-th artificial neuron, $\phi(\cdot)$ is an activation function, $W_k$ is a vector of weights for the k-th artificial neuron (e.g., weights in high-precision weights 114 or low-precision weights 116), and $X_k$ is a vector of value of inputs to the k-th artificial neuron. In some examples, one or more of the inputs to the k-th artificial neuron is a bias term that is not an output value of another artificial neuron or based on source data. Various activation functions are known in the art, such as Rectified Linear Unit (ReLU), TanH, Sigmoid, and so on.

In accordance with a technique of this disclosure, memory 102 stores a set of low-precision weights 116 for DNN 106 (which may be referred to herein as a first set of weights), a set of high-precision weights 114 (which may be referred to herein as a second set of weights), and a set of bit precision values 118. This disclosure denotes high-precision weights 114 as W and denotes low-precision weights 116 as $\tilde{W}$. As described in detail below, both high-precision weights 114 and low-precision weights 116 may be used as the weights in equation (1). Bit precision values 118 include a bit precision value for each layer 108 in DNN 106. The bit precision value for a layer indicates a bit depth of weights for the layer in low-precision weights 116. Furthermore, as described in detail below, a training process may concurrently determine values of high-precision weights 114, low-precision weights 116, and bit precision values 118. Use of DNN 106 with high-precision weights 114 and low-precision weights 116 may yield comparable output data. However, because low-precision weights 116 may contain fewer bits than high-precision weights 114, fewer operations may be required to read low-precision weights 116 from memory 102 than may be required to read high-precision weights 114 from memory 102. Furthermore, in some examples, because low-precision weights 116 may contain fewer bits than high-precision weights 114, machine learning system 104 may store low-precision weights 116 using a datatype that occupies fewer bits. For instance, machine learning system 104 may use 8-bit integers for low-precision weights 116 and may use 32-bits for each of high-precision weights 114. Thus, after training when only low-precision weights 116 are used, the storage requirements may be reduced. Furthermore, the number of read operations may be reduced, which may result in less delay and less electricity consumption.

As described in detail below, as part of performing the training process, machine learning system 104 may perform a feed-forward phase in which machine learning system 104 uses high-precision weights 114 in DNN 106 to determine output data 112 based on input data in input data set 110. Furthermore, machine learning system 104 may perform a backpropagation method that calculates a gradient of a loss function. The loss function produces a cost value based on the output data. In accordance with a technique of this disclosure, machine learning system 104 may then update high-precision weights 114, low-precision weights 116, and bit precision values 118 based on the gradient of the loss function. Machine learning system 104 may perform the feed-forward method and backpropagation method many times with different input data. During or after completion of the training process, machine learning system 104 or another device may use low-precision weights 116 in an evaluative process to generate output data based on non-training input data.

In the example of FIG. 1, memory 102 also stores a set of one or more hyperparameters 120. Hyperparameters 120 may include a hyperparameter that controls a learning rate. Furthermore, in accordance with a technique of this disclosure, hyperparameters 120 may include a hyperparameter (denoted $\lambda_2$ in this disclosure) that controls a severity of a bit precision penalty term in the loss function. The bit precision values 118 (i.e., the number of bits used in low-precision weights 116 for each layer 108 of DNN 106) may be based on the value of the bit precision penalty term. Thus, different values of the hyperparameter may result in a loss function that penalize to different degrees cases where DNN 106 uses weights with higher bit precisions.

DNNs are becoming larger and deeper in layers to learn higher levels of semantic and spatiotemporal dependencies of application data. In fact, over the last decade, DNN parameter sizes have exponentially grown from the much simpler LeNet-5 Convolution Neural Net (CNN) using only 1 million parameters (i.e., weights) to classify handwritten digits to the AlexNet CNN that used 60 million parameters to win the ImageNet image classification competition in 2012, and to new DNNs such as Deepface using 120 million parameters for human face verification. There are even networks with 10 billion parameters.

How DNN 106 uses memory 102 is important because memory 102 stores the parameters of DNN 106 (e.g., high-precision weights 114, low-precision weights 116). For instance, more storage locations in memory 102 are required to store more parameters of DNN 106. Moreover, memory access (i.e., reading from and writing to the memory) requires electrical energy. Thus, the size of storage locations in memory 102 available for storage of the parameters may reflect the learning capacity of DNN 106 (i.e., the capacity of DNN 106 to learn things), and at the same time, the size of the storage locations in memory 102 available for storage of parameters may impact the computational efficiency and processing time of DNN 106. For example, the AlexNet CNN with 630 million synaptic connections would roughly consume an estimated 3 Tflops/s (assuming 512×512 images at 100 Gflops/frame). Furthermore, based on rough estimates, the AlexNet CNN would consume 8 watts for DRAM access alone, far exceeding the power budgets for a typical mobile device. Thus, the computation and run-time memory footprint required for these modern DNNs in inference mode may exceed the power and memory size budgets for a typical mobile device. Larger scale DNNs can reach up to 1 billion parameters, and the trend is toward larger and deeper networks is growing.

Reiterating on the issue of power and memory size, it is well understood that power densities no longer scale down with Moore's Law, and computational throughput necessitates scaling energy efficiencies (e.g., joules/operation). To a first order, the energy for an operation is comprised of: (1) energy for the computation, e.g., floating point operation, (2) energy to move data to/from storage to the processing core, and (3) energy required to store data. It is also well established that energy for data movement (e.g., memory read and write operations) is likely to dominate the energy cost of computation. This effect may be amplified by the DNN computational characteristics with low operations/byte ratio and poor locality behaviors.

Memory performance continues to lag computation, which is evident in the slow growth in package pins, bandwidth and frequency, and more importantly, in a memory architecture that is practically unchanged for decades. Latency hiding using tailored cache and memory hierarchies are no longer productive because energy use cannot be hidden. Data movement and storage energy incur cost; hence, they degrade overall efficiency and scalability, if not managed.

Regularization is a technique used to solve the overfitting problem in machine learning. In general, regularization techniques work by adding a penalty term to the loss function used in training a DNN, as shown in equation (2), below:

$$L(\bullet) + \lambda N(w) \quad (2)$$

In equation (2), $L(\bullet)$ is the loss function, $\lambda$ is a hyperparameter, and $N(w)$ is a norm of the weight vector w. Traditional approaches to regularization in machine learning have been shown to be ineffective for DNNs. Well-studied regularization techniques like LASSO and L-2 control the magnitude of parameters but not the precision of the parameters. Prior work known as BinaryConnect relates 1-bit precision parameters to a particular form of regularization. In particular, BinaryConnect is a method that trains a DNN with binary weights during forward and backward propagation, while retaining precision of the stored weights in which gradients are accumulated.

Historically, bit-level precision of parameters has been explored under post processing for the purpose of compression of DNNs. The state-of-the-art requires either the bit-level precision to be fixed beforehand or separates into two steps the learning of DNN parameters and the compression of the DNN parameters. The techniques here may balance both criteria, whose hyperparameters provide a flexible way to specify the resource constraints of the target device and may find an optimal bit-precision per DNN layer going from coarse binary representations of the parameters to fine-grained 32-bit representations of the parameters.

One goal of these techniques is to directly address the exponential growth in memory sizes for large DNNs by exploring new approaches that accommodate low precision weights. The techniques here may balance algorithm performance with energy savings, with the appreciation that these approaches cannot take a carte blanche application of simple truncation, rounding or recasting of floating point to lower precision integers. DNNs are typically over-parameterized in that there is significant redundancy in the learning model. On the one hand, sparsity of the learnt representations may offer a DNN high algorithmic performance, but at the same time, it is easy to arrive at a DNN that is wasteful in both computation and memory. In this context, sparsity may refer to the use of low-precision weights, which may only take a limited (sparse) number of values. Hence, in some examples of this disclosure, a goal is to find a balance where the DNN sparsity (and therefore robustness and algorithm performance) is maintained without over-parameterizing the model.

There may be several advantageous outcomes from the techniques set forth in this disclosure. First, the memory size for DNN 106 may be optimized. Second, a learning rate may be faster because the training process set forth in this disclosure may better guide the learning target. Third, the resulting DNN may achieve higher performance and lower power consumption.

With respect to the learning rate, it is noted that one of the most difficult unresolved challenges in training DNNs is the training of DNNs within a limited amount of training time. From a learning standpoint, a natural question is what is the optimal number of bits per layer of a DNN, and in contrast to the previous work, give a gradient descent algorithm to optimize the number of bits using training data in input data set 110. The variable number of bits as the number of unique values taken by the parameters, and use this directly as a regularizer for the classification performance of a convolutional network or other type of DNN. There is no equivalent matrix norm used as a regularizer in the machine learning literature, forming a direct relationship between the low level bit precision and our formulation using regularization inspired by the minimum description length principle. In comparison to networks with full-precision weights, the techniques here may demonstrate improved anytime learning using a number of bits that varies over training epochs.

The explosion in capabilities of neural networks has been fueled mainly by the transition to better hardware. DNNs are fundamentally based on matrix multiplications (more specifically, the computation of multiple weighted summations—one per neuron) as their most common and most central operation. Since matrix multiplications are highly parallelizable, the use of GPUs has allowed DNNs to scale and to run and train at much larger speeds. This, in turn, has made it possible to reduce training time on very large datasets from years that would be required on serial hardware, to weeks or days. It is the reason for the performance leaps in AI seen in recent years.

At the same time, it may be desirable for computer architects to look into new ways to make DNN processing more amenable for use on mobile platforms with more constraints to speed or energy consumption. GPUs provide speed-ups from massive parallelization, but their scaling behavior is limited because they do not fully exploit the simplicity of weighted summations used in DNNs. As new hardware accelerators come to the market, most are offering integer-based support for DNN processing. Furthermore, advanced nanoelectronics may be more prone to manufacturing variance, which may widen device operating variance and affect yield. Examples implementing one or more of the techniques of this disclosure may simplify the complexity of the underlying logic and may address manufacturability with potentially optimal memory size and settings.

The number of unique values allowed for the parameters can be viewed as a measure of regularization. Thus, as described in greater detail below, instead of using $N(w)$ as a penalty term as shown in equation (2), a penalty term may be, or may be based on, the number of unique values that the parameters of DNN 106 can have. The expressive power of DNN 106 may be controlled gradually by restricting the set of allowed values for its parameters. Thus, the techniques here may use the idea of bit-level precision to regularize the training of the parameters of DNN 106. These techniques may connect the idea of bit-level precision to regularization of the training of the parameters of DNN 106.

The techniques here may generalize and encompass prior work that uses two stages (learning of DNN parameters and compression) as above. Other approaches to address memory size (including compression, quantization and approximation of DNNs), power consumption, and computation speed are not sufficient because: (1) they assume an optimally trained DNN is given as input, (2) they are agnostic to the performance of the compressed DNN with regard to labeled ground truth data, (3) they offer lower algorithmic performance for any given target level of compression, and (4) they do not demonstrate acceleration in learning during training. The techniques here may be applicable in many areas for deep learning applications and systems, as the techniques may apply to the basic ability to train and compress the learnt concepts into a small form factor.

Using the techniques here, one can design and leverage hardware accelerators with multi-bit precision that can support DNN processing more efficiently. The techniques here may take a specification of a target field device into account (e.g., available memory) when training DNN 106; and may guide the learning for that specific training data on the specific target field device. The techniques here may be valuable tools for practitioners who deploy DNN-based machine learning solutions to real world applications, including but not limited to mobile platforms and smartphones. The techniques here may enable powerful DNNs for resource constrained environments. The techniques here may support yield enhancements in advanced nanotechnology by finding potentially optimal bit precisions and weights. The techniques here may support faster on-line learning (e.g., in robots in the field), and other on-board systems where resource (power, size, etc.) constraints limit deployment today.

This disclosure describes techniques to train a DNN such that the bit precision is part of the parameters in the training procedure. Current training methods consist of model selection (e.g., learning rate, network size, network depth) and a training phase (e.g., using a backpropagation algorithm to set the weights of the network over many iterations). This disclosure describes how to include the optimization of bit precision as part of the training phase. Thus, this disclosure describes a training method for DNN 106 with bit precision itself as a parameter. The resulting DNN may have different bit precision for each of the layers 108 of DNN 106. Such an approach may exhibit faster learning (i.e., may converge faster to a solution), and may arrive at a superior target DNN (e.g., higher algorithmic performance with regard to ground truth) in comparison to standard approaches to training DNNs.

Although the approach is generally applicable to any gradient based parameter learning for classification or regression, attention in this section of this disclosure is restricted to CNNs. In this disclosure, uppercase symbols denote tensors and lowercase symbols denote vectors. Let $X^{(l)}$ denote the input of the l-th layer. $X^{(l+1)}$ denotes the output of the l-th layer. $W^{(l)}$ denotes the parameters of the l-th layer. W denotes the set of all CNN parameters $\{W^{(1)}, W^{(2)}, \ldots W^{(M)}\}$ with N layers numbered (1), (2), ..., (N). In this disclosure, $\odot$ denotes dot product, and $\phi$ is a smooth non-linearity applied pointwise to the output for the filtering. Let y be the labels for a mini-batch of examples corresponding to $X^{(l)}$, which is the input data set 110.

In the example of FIG. 1, DNN 106 may comprise a CNN that implements feed-forward convolutions over multiple filter banks called layers (i.e., layers 108). The output of a convolutional layer is typically connected to a pooling layer that outputs the maximum of the activations within the neighborhood of each pixel. The output of a fully connected layer l is simply the dot product of the input and parameters of the layer, as indicated in equation (3), below.

$$X^{(l+1)} = \phi(W^{(l)} \bullet X^{(l)}) \tag{3}$$

In equation (3), $\phi$ is a smooth non-linearity applied pointwise to $W^{(l)}$ and $X^{(l)}$. A convolutional layer implements a special form of weight sharing by replicating the weights across one of the dimensions of the input. In this case, the dot product in equation (3) becomes a convolution operation using the kernel $W^{(l)}$, as shown in equation (4), below.

$$X^{(l+1)} = \phi(W^{(l)} * X^{(l)}) \tag{4}$$

In this disclosure, * denotes the convolution operation. A convolutional layer is typically connected to a pooling layer that outputs the maximum of the activations within a neighborhood of each pixel. The neighborhoods may be referred to as "patches." For purposes of classification, the patches produced above may be used as the features of a logistic regression layer, as shown in equation (5), below.

$$X^{(l+1)} = \text{softmax}(W^{(l)} \bullet X^{(l)}) \tag{5}$$

In equation (5), for any vector $v \in \mathbb{R}^D$, softmax(v) is a vector with entries:

$$\frac{\exp(v_i)}{\sum_{j=1}^{d} \exp(v_j)}, i = 1, 2, \ldots D.$$

The output of the CNN is a vector of size D×1 that assigns a score to each of D labels.

To complete the description of the CNN, $X^{(1)}$ is set to the input data or image. In some examples, the predicted label (i.e., a label generated as output by DNN 106) may be arg max $X^{(N)}$ for a CNN with N layers numbered (1), (2), ..., (N). In other words, machine learning system 104 may compute the predicted label as the index i with the maximum value in $X_i^{(N)}$. Different operations are shown below:

$X^{(l+1)} = \phi(W^{(l)} * X^{(l)})$ Convolution $X^{(l+1)} \times \phi(W^{(l)} \odot X^{(l)})$ Fully connected $X^{(N)} = \text{softmax}(W^{(l)} | X^{(l)})$ Classification $$y = \text{argmax}_{i=1}^{D} X_i^{(N)} \text{ Predicted label} \tag{6}$$

Maximum likelihood estimation is the most common way to learn the filters from training data. Given a batch of B independent and identically distributed (IID) input-label pairs $(X^{(l)}, y)$ with $y \in \{1, 2, \ldots, D\}^B$, the loss function below captures the mean log-likelihood. Due to the IID assumption, the likelihood is decomposed into the product of likelihoods over individual examples. Then, using properties of logarithm, the log of the product becomes the sum of log terms.

$$l(W) = -\frac{1}{B} \log P(y | X^{(l)}; W) = -\frac{1}{B} \log \prod_{i=1}^{B} P(y_i | X_i^{(1)}; W) \tag{7}$$

$$= -\frac{1}{B} \log P(y_i | X_i^{(l)}; W) = -\frac{1}{B} \sum_{i=1}^{B} \log(X_{i,y_i}^{(n)}). \tag{8}$$

Techniques here may use a range preserving linear transform that uniformly discretizes the range into fixed steps δ. Concretely, let $W^{(l)}$ denote the floating point representation of high-precision weights 114 for layer l and let $\tilde{W}^{(l)}$ be the quantized version of the weights of layer l using b bits. A quantization using b bits is, $$\alpha = \min_w(W^{(l)}), \beta = \max_w(W^{(l)}) \quad (9)$$

$$\delta = f(W^{(l)}, b) = \frac{\beta - \alpha}{2^b} \quad (10)$$

$$\tilde{w} = g(w; \alpha, \delta) = \alpha + \delta \times \text{round}\left(\frac{w - \alpha}{\delta}\right), w \in W^{(l)} \quad (11)$$

$$= \alpha + \left(\left[(\beta - \alpha) \times \text{round}\left(\left[\left(\frac{w-\alpha}{\beta-\alpha}\right) << b\right]\right)\right] >> b\right), w \in W^{(l)} \quad (12)$$

Equations (11) and (12) may be restated as:

$$\tilde{W} = \alpha + \delta \times \text{round}\left(\frac{W - \alpha}{\delta}\right) \quad (13)$$

In the equations above, $\min_w(W^{(l)})$ returns a lowest weight in $W^{(l)}$, $\max_w(W^{(l)})$ returns a greatest weight in $W^{(l)}$, round (v) returns the nearest integer and $\upsilon \in \mathbb{R}$. For any fixed $W^{(l)}$ and b, $\tilde{w}$ is a step function over the range of values in $W^{(l)}$. Let $\tilde{W}$ denote the quantized tensor consisting of $\tilde{w}$ corresponding to each of $w \in W$. For a fixed W and b and varying $\alpha \le w \le \beta$, $\tilde{w}$ is a step function with discontinuities at multiples of δ/2. This issue may prevent a direct optimization of the loss as a function of the quantized $\tilde{w}$ using gradient descent.

In some examples, quantization is deterministic with an efficient and closed form output. In such examples, the techniques use the same error criterion as K-means clustering for calculating the error due to quantization, viz. the sum of squared rounding errors, $$q(W^{(l)}, b) = \frac{1}{2} \|W^{(l)} - \tilde{W}^{(l)}\|_2^2 \quad (14)$$

In equation (14) and elsewhere in this disclosure, $\|\upsilon\|_2^2$ denotes the square of a 2-dimensional norm of a vector v (i.e., $\|\upsilon\|_2 = (|v_1|^2 + |v_2|^2 + \ldots + |v_N|^2)^{1/2}$. Similar to the objective function of K-Means clustering, the sum of squared rounding errors defined in equation (14) is a convex and differentiable measure of the error due to quantization. For any fixed b, q(w, b) may form a series of parabolas over some scalar $w \in \mathbb{R}$ and its value is bounded by $0 \le q(w, b) < \delta/2$.

In some examples, low-precision weights 116 are constrained to being integer powers-of-two. For instance, low-precision weights 116 may have values of the type $2^{-n} \ldots 2^0, \ldots 2^n$, where each potential value of n is an integer. More specifically, low-precision weights 116 may be defined as:

$$S = \{0\} \cup \{\pm 2^k : k \in \mathbb{Z}\} \quad (15)$$

In equation (15), $\mathbb{Z}$ is the set of integers. In other words, low-precision weights 116 may be 0, ±1, ±2, ±4, ..., and ±½, ±¼, ±⅛, ....

In examples where low-precision weights 116 are constrained to being integer powers-of-two, machine learning system 104 may use logical shift operations instead of multiplication operations to compute output values of artificial neurons of DNN 106 when operating DNN 106 in inference mode. This may result in DNN 106 operating more efficiently and potentially with lower latency in inference mode because shift operations are less complex than multiplication operations. The selection of values that are integer powers-of-two represents a quantization of high-precision weights 114. It is understood that other mappings besides integer powers-of-two, can be selected, for example, when hardware can utilize those mappings to affect a multiplication operation or an approximation of the multiplication operation, based on the mappings. For example, an analog circuit may use a ternary encoding of analog values (low, medium, high) to affect circuit operation (e.g. voltage or current divider) that is equivalent to a multiplication operation. To better match the distribution of values between high-precision weights 114 and low-precision weights 116, machine learning system 104 may select, during training of DNN 106, a quantization function that best preserves the encoded distribution of the high-precision weights 114, even if the quantization is non-differentiable. For example, machine learning system 104 may use the following quantization function:

$$\tilde{w} = \text{sign}(w) * 2^{\text{round}(\log_2 |w|)} \quad (16)$$

In equation (16), w is one of high-precision weights 114 and w is the corresponding one of low-precision weights 116. In equation (16), sign(w) is a function that returns a sign of weight w or returns zero if w is close to zero (e.g., with a given range of values centered on 0). round is a rounding function. In some examples, round is implemented using stochastic rounding. Stochastic rounding refers to a randomized way of rounding numbers, such as a value of 0.3 has a 70% chance of being rounded to 0 and 30% chance of being rounded to 1. A value of half has a 50-50 chance of being rounded to 0 or 1.

In some examples where low-precision weights 116 are constrained to integer powers of two, machine learning system 104 may use the following quantization function:

$$\tilde{w} = \text{sign}(w) 2^{\text{round}(q(w; \theta^{(l)}))} \quad (17)$$

In equation (17), q (w; $\theta^{(l)}$) may be any transformation of parameters W (i.e., high-precision weights 114). Furthermore, in equation (17), $\theta^{(l)}$ are parameters for each layer l. In some examples, q(w; $\theta^{(l)}$) may be defined as:

$$q(w; \theta) = \theta_1 + \theta_2 \log_2 |w| \quad (18)$$

In equation (18), $\theta_1$ and $\theta_2$ are parameters. There may be different values of $\theta_1$ and $\theta_2$ for each layer, which are denoted $\theta_1^{(l)}$ and $\theta_2^{(l)}$. Thus, in equation (18), the symbol θ without subscripts may represent one or more parameters, such as $\theta_1$, $\theta_2$, etc. Accordingly, in examples where machine learning system 104 uses equation (18) in the quantization function of equation (17), machine learning system 104 may determine $\tilde{w}$ as:

$$\tilde{w} = \text{sign}(w) 2^{\text{round}(\theta_1 + \theta_2 \log_2 |w|)} \quad (19)$$

Thus, in this example, for each weight of the set of low-precision weights 116, machine learning system 104 may be configured such that, as part of updating the set of low-precision weights 116, machine learning system 104 may determine the weight of the set of low-precision weights 116 to be equal to a sign value multiplied by two to the power of an exponent value, where the sign value indicates a sign of a corresponding weight in the set of high-precision weights 114 and the exponent value us based on a log base 2 of the corresponding weight in the set of high-precision weights 114.

In equations (18) and (19), $\theta_0$ and $\theta_2$ may have various values. For instance, in one example, $\theta_1 = 0$ and $\theta_2 = 1$, giving the identity transform. The case when $\theta_1 = \theta_2 = 0$ corresponds to ternary quantization based on the sign of the weight w. The case when $\theta_1 < 0$; $\theta_2 < 0$ gives a family of hyperbolas whose foci and eccentricity are controlled by θ. The case when $θ_1 > 0$ gives a family of hyperbolic tangent functions. In one example, let W be the matrix:

$$\begin{pmatrix} 2.5 & 1 & 1.3 & 0.75 \\ 1 & -2.5 & -1.2 & -0.9 \end{pmatrix}$$

with $θ_1 = -1$ and $θ_2 = -3.5$. In this example, machine learning system 104 may determine that $\tilde{w}$ is:

$$\begin{pmatrix} 2^{-6} & 2^{-1} & 2^{-2} & 2^{0} \\ 2^{-1} & -2^{-6} & -2^{-2} & -2^{0} \end{pmatrix}$$

Note that the value of 2.5 was quantized to $2^{-6} = 0.015625$ with large quantization error. Some experiments have shown that the quantization error is not very important for high accuracy, and that the learned values of θ are non-trivial.

In some examples where each of low-precision weights 116 is an integer power of two, machine learning system 104 may store low-precision weights 116 by storing merely the exponent and sign, instead of the full integer value or a floating point value. This may conserve storage space. For instance, in an example where the maximum value of the exponent is 127, machine learning system 104 may use an 8-bit integer for a 4× model compression compared to the storage of floating point parameters.

There is a manifold motivation for quantization of parameters. Firstly, it may be desirable to reduce the memory footprint of the trained CNN model, allowing deployment on small embedded and mobile field devices. Secondly, these devices do not satisfy the high computational needs required for inference using the CNN model. Thirdly, it may be desirable to reduce the energy and power consumption of the trained CNN model. Fourthly, the processors on devices built using advanced nanoelectronics may have manufacturing variance, which may require different precisions for inference using the CNN model. The techniques here may address these concerns during the training of the CNN without any post-hoc optimization and analyses. The techniques here may limit the number of unique values taken by the parameters. The first observation is that the range of values taken by the parameters in a CNN lie in a small range. Thus, the techniques here may use far fewer bits to represent the few unique values within a small range.

As discussed elsewhere in this disclosure, previous work has studied more complex quantization methods including stochastic rounding, density-based quantization, and K-means clustering. Examples of this disclosure may use a simple rounding method that allows the number of bits to be learned via backpropagation simultaneously with the parameters of the CNN. In some examples of this disclosure, machine learning system 104 uses deterministic rounding. In some examples, machine learning system 104 uses stochastic rounding using straight through estimators. Use of a straight through estimator means that during training using back propagation, machine learning system 104 ignores the discrete functions. Quantization maps ranges of values into single values referred to as "bins." Note that uniform placement of "bins" may be asymptotically optimal for minimizing the mean square error regardless of the source distribution. Various examples of this disclosure may work with any differentiable transform mapping bin indices to real values, for example, one can use logarithmic scale quantization. Recall that the native floating point precision is also a non-linear quantization.

Previous work has studied non-uniform binning schemes such as using the density of the parameters, fisher information, and K-means clustering. Although the K-means approach also minimizes the squared error, it requires a more complicated algorithm with two separate stages for clustering and back-propagation. The uniform binning scheme empirically outperforms density-based binning because the peaks of the initial estimate of the parameters do not necessarily guide the learning towards optimal parameters. K-means clustering also minimizes the squared error, but it requires alternating steps of backpropagation with (hard) cluster assignment which is non-differentiable in general.

Techniques of this disclosure may work with any differentiable transform, the linear scale of quantization is a design choice that uses equidistant 'bins' between α and β. For example, one can use logarithmic quantization as shown by Daisuke Miyashita et al., "Convolutional Neural Networks using Logarithmic Data Representation," arXiv: 1603.01025 (available from https://arxiv.org/pdf/1603.01025.pdf), in their post-hoc compression algorithm. Recall that the native floating point precision is also a non-linear quantization, using a few bits to represent the exponent and the remaining bits to store the fraction. In Song Han et al., "Deep Compression: Compressing Deep Neural Networks with Pruning, Trained Quantization and Huffman Coding," arXiv:1510.00149 (available from https://arxiv.org/pdf/1510.00149.pdf), the linear quantization was shown to perform better than density-based quantization, that focuses on peaks of the distribution of W via inverse cumulative distribution function (CDF) sampling. Inverse CDF sampling is a method to sample random numbers from a probability distribution e.g. if a coin turns head with probability 0.3, how do you sample if a random event is head or tail? Sample a random number between 0 and 1, if it is less than 0.3 then it is a head. Inverse CDF sampling is the technical term for this for any probability distribution. The techniques here may optimize the values of W and b simultaneously using stochastic gradient descent. The techniques here may allow each layer to learn a different quantization, which has been shown to be beneficial.

In some examples, an objective of learning is to arrive at a CNN with parameters W with a low total number of bits. For instance, a goal is to learn the number of bits jointly with the parameters of the network via backpropagation. Accordingly, in some examples, layer-wise quantization is adopted to learn one $W^{(l)}$ and $b^{(l)}$ for each layer l of the CNN. However, the loss function $l(\tilde{W})$ is not continuous and differentiable over the range of parameter values. Furthermore, the loss remains constant for small changes in W as these are not reflected in $\tilde{W}$, causing stochastic gradient descent to remain in plateaus. Hence, in accordance with one or more examples, machine learning system 104 updates the high precision weights 114 (W) such that the quantization error q(W, b) is small. The intuition is that when W and $\tilde{W}$ are close, machine learning system 104 can use l(W) instead. Machine learning system 104 may minimize the loss function that is the negative log likelihood regularized by the quantization function q, where q may be defined according to any of the examples of this disclosure, such as equation (14) or equation (18).

When b is not fixed (i.e., when b has been determined using backpropagation), the value of b will be maximized (e.g., 32 bits) in order to minimize the quantization error. Thus, in accordance with a technique of this disclosure, a penalty term is added for the number of bits; that is, the number of unique values taken by the network parameters. The uniformly spaced quantization model allows a simple function for the number of unique values. In accordance with a technique of this disclosure, machine learning system 104 adopts layer-wise quantization to learn one $\tilde{W}^{(l)}$ and $b^{(l)}$ for each layer l of the CNN. For example, machine learning system 104 may use the loss function $l(\tilde{W})$ defined in equation (20), below, as a function of $l(W)$ defined in Equations (7) and (8) and $q(W, b)$ defined in equation (14), above.

$$l(\tilde{W}) = l(W) + \lambda_1 \sum_{i=1}^{n} q(W^{(i)}, b^{(i)}) + \lambda_2 \sum_{i=1}^{n} 2^{b^{(i)}} \quad (20)$$

In Equation (20), $\lambda_1$ and $\lambda_2$ are hyperparameters used to adjust the trade-off between the two objectives of minimizing quantization error and minimizing bit depths. When $\lambda_1=0$ and $\lambda_2=1$, the CNN uses 1-bit per layer due to the bit penalty. When $\lambda_1=1$ and $\lambda_2=0$, the CNN uses a maximum allowed number of bits (e.g., 32 bits) per layer in order to minimize the quantization error. The parameters $\lambda_1$ and $\lambda_2$ allow flexibility in specifying the cost of bits versus its impact on quantization and classification errors.

In some examples, such as examples where low-precision weights 116 are constrained to integer powers of 2, machine learning system 104 may use the loss function $l(\tilde{W})$ defined in equation (21), below, as a function of $$l(\tilde{W}) = l(W) + \lambda_1 D(W, \theta) + \lambda_2 \sum_{i=1}^{n} 2^{b^{(i)}} \quad (21)$$

In equation (21), $l(W)$, $\lambda_1$, $\lambda_2$, and b may have the same meanings as in equation (20). However, in equation (21), $D(W, \theta)$ denotes a distillation loss. The distillation loss indicates a difference between the output generated by DNN 106 when machine learning system 104 runs DNN 106 on the same input using high-precision weights 114 (W) and using low-precision weights 116 ($\tilde{W}$). As shown above with respect to equation (19), low-precision weights 116 may be calculated from high-precision weights 114 (W) and from the parameters $\theta$. Hence, D may be parameterized by W and $\theta$ as shown in equation (21).

In some examples, the values of the hyperparameters may be selected (e.g., by machine learning system 104 or a technician) based on one or more of availability of resources (e.g., a FPGA fabric or GPU cores), the quality of data based on algorithm tasks (e.g., a blurry image might require higher precision network), or other factors. In some examples, the values of the hyperparameters may be selected based on manufacturing variance in advanced nanoelectronics. Processing latency and energy consumption may be reduced because of the close coupling of the bit-precision, memory, and energy consumption.

On the other hand, consider updating b given a fixed W. Consider two choices for this update which correspond to halving or doubling the number of bins. In the case that W is optimal and that $\lambda_2=0$, this corresponds to finding the bits with the smallest quantization error. In almost all cases, this would correspond to using all 32-bits within the range of W. Thus, a penalty of $\lambda_2 \neq 0$ is added for each bin, so that there is a trade-off between the quantization error and the number of bits. When $\lambda_1=0$, this results in using 1-bit per layer due to the penalty.

In examples where machine learning system 104 calculates the loss function in accordance with equation (20) during training, machine learning system 104 may update W and b using the following rules expressed in Equations (22) and (23), retaining the high floating point precision updates to W.

$$W \leftarrow W - \mu \frac{\partial l(\tilde{W})}{\partial W} \quad (22)$$

$$b \leftarrow b - \text{sign}\left(\mu \frac{\partial l(\tilde{W})}{\partial b}\right) \quad (23)$$

In equations (22) and (23), $\mu$ is a hyperparameter indicating the learning rate. The updated value of W in Equation (22) is projected to W using quantization as shown in Equation (14). Machine learning system 104 may use the automatic differentiation provided in Bergstra et al., "Theano: A cpu and gpu math compiler in python", In Proc. 9th Python in Science Conf., pages 1-7, 2010 (hereinafter, "Theano"), calculating gradients with respect to Equations (22) and (23).

As shown in Equation (24), below, the sign function of Equation (23) returns the sign of the operand unless the operand is close to zero, in which case the sign function returns a zero. This allows the number of bits to converge as the learning rate and gradients go to zero. In some examples, $\epsilon=10^{-9}$.

$$\text{sign}(x) = \begin{cases} 0 : |x| < \epsilon \\ 1 : x > \epsilon \\ -1 : x < -\epsilon \end{cases} \quad (24)$$

In some examples, such as examples where the weights are constrained to be powers of two and machine learning system 104 calculates the loss function as shown in equation (21), for each layer l, machine learning system 104 may update the bit depth of layer l (i.e., $b^{(l)}$) according to the following equations:

$$\theta_1 \leftarrow \theta_1 - \mu \frac{\partial l(\tilde{W})}{\partial \theta_1} \quad (25)$$

$$\theta_2 \leftarrow \theta_2 - \mu \frac{\partial l(\tilde{W})}{\partial \theta_2} \quad (26)$$

$$m = \min_{w \in W^{(l)}} \text{round}(q(w; \theta)) \quad (27)$$

$$M = \max_{w \in W^{(l)}} \text{round}(q(w; \theta)) \quad (28)$$

$$b^{(l)} = 1 + \lceil \log_2(M - m + 1) \rceil \quad (29)$$

In equations (27), (28), and (29), $q(w; \theta)$ may be defined as shown in equation (18). Note that equation (18) is dependent on the values of $\theta_1$ and $\theta_2$. Thus, in this example, for each layer of the plurality of layers, machine learning system 104 may be configured to determine a set of quantized values for the layer by rounding values produced by applying a quantization function (e.g., $\theta_1 + \theta_2 \log_2 |w|$) to weights in the second set of weights (i.e., high-precision weights 114) that are associated with the layer. Additionally, machine learning system 104 may determine a maximum value in the set of quantized values for the layer and a minimum value in the set of quantized values for the layer. Machine learning system 104 may then set the bit precision values of the layer ($b^{(l)}$)(based on a log base 2 of a range defined by the maximum value in the set of quantized values and the minimum value in the set of quantized values. Thus, in this example, each low-precision weight of layer l may be stored in memory 102 as sign value and an integer of $b^{(l)}$ bits. Rather than storing the value $b^{(l)}$ itself in memory 102, memory 102 may instead store the values of $\theta_1^{(l)}$ and $\theta_2^{(l)}$ and calculate $b^{(l)}$ from $\theta_1^{(l)}$ and $\theta_2^{(l)}$ as shown in equations (25) through (29), above.

The loss function of Equation (20) encourages small and/or large updates to W and discourages moderate sized updates. For the purpose of exposition, consider two bins at $\{0, 1, -1\}$ (i.e., ±1) and consider some weight that is equal to zero. A standard gradient descent may update the weight in any direction, but an update of magnitude less than ½ does not change $\tilde{W}$, and thus does not improve the classification loss. Further, such an update incurs a quantization error as the weight is rounded to zero. Similarly, an update of magnitude between half and one also incurs a quantization penalty. The best update using the loss as defined in Equation (20) (or as defined by l(W)+q(W, b)) may be ±1, whichever improves the likelihood estimate, without incurring any quantization error.

Note that $l(\tilde{W})$ is a convex and differentiable relaxation of the negative log likelihood with respect to the quantized parameters. It is clear that $l(\tilde{W})$ is an upper bound on $l(W)$ which is the Lagrangian corresponding to constraints of small quantization error using a small number of bits. The uniformly spaced quantization of Equation (14) allows this simple functional form for the number of unique values.

The quantization penalty, combined with the classification loss, can have a significant impact on the learning curve, and in some cases as we show empirically, may accelerate the learning when the learning rate is fixed. This phenomenon has been noted in previous work on binary neural networks, in that the quantization acts as a regularizer by ignoring minute changes and amplifying sizeable changes to parameters. Furthermore, it has been shown in previous works that the final parameters of the CNN have a bi-modal distribution. Most of the previous work on approximation and compression of DNNs does not leverage this benefit because they separate learning from post-hoc quantization or assume a pretrained network is provided.

In some examples, once training is finished, machine learning system 104 may discard the high precision weights 114 (W) and only store $\tilde{W}$, α and δ for each layer. Machine learning system 104 may then use low-precision weights ($\tilde{W}$) in DNN 106. Machine learning system 104 may encode all parameters of the layer as integers corresponding to indexes of the bins, which may significantly reduce storage requirements of low-precision weights 116. One may leverage this form of the parameters as shown in Equation (30), below, to design hardware accelerators with the goal of faster convolutions and dot products (e.g., using FPGAs).

$$w = \alpha + \delta z, z \in \mathbb{Z} \quad (30)$$

In Equation (30), z is an index of a bin. Thus, for each layer, machine learning system 104 may store only one value of α and one value of δ in memory 102 for the layer and may store individual integer values z for each input in the layer.

In some examples where low-precision weights 116 are constrained to integer powers of 2, once training is finished, machine learning system 104 may discard high-precision weights 114 (W) and store the values of low-precision weights 116 ($\tilde{W}$) as exponent values. Thus, machine learning system 104 may store a value z for a low-precision weight w and reconstruct the low-precision weight $\tilde{w}$ as:

$$\tilde{w} = 2^z \quad (31)$$

The memory required to store the final model may be significantly reduced because our approach allows the selection of bit precision as part of the training process. Machine learning system 104 may use and/or store only two floating point numbers per layer, and all the parameters of the CNN may be encoded as integers. Inversely, only two floating point operations are needed for inference or prediction, along with operations among integers. Thus, DNN 106 can be easily deployed, within the reach of the computational capabilities of most field devices, FPGAs and complex programmable logic device (CPLD), mobile devices, etc.

This is a generic method to train DNNs that may also take a specification of a target field device into account (e.g., available memory) and may guide the learning for that specific training data and device. Example types of target field devices may include mobile phones, tablet computers, laptop computers, desktop computers, server computers, Internet of Things (IoT) devices, autonomous vehicles, robots, and so on. This disclosure may refer to a DNN trained in accordance with techniques of this disclosure as a BitNet DNN. BitNet DNNs may have different bit precision values for different layers. BitNet DNNs may be applicable in many areas from image recognition to natural language processing. BitNet DNNs may be beneficial to practitioners who deploy DNN-based machine learning solutions to real world applications, including but not limited to mobile platforms and smartphones. The techniques of this disclosure may enable powerful DNNs for resource constrained environments. Coupling in the simplicity of the basic DNN processing to reduce memory sizes and finding new forms of parallelisms may be advantageous. As described in detail elsewhere in this disclosure, machine learning system 104 may use DNN 106 to map other DNNs of a neural network software architecture to processors of a hardware architecture. Furthermore, in some examples, machine learning system 104 may train BitNet DNNs for operation on various hardware architectures.

Figure 2:
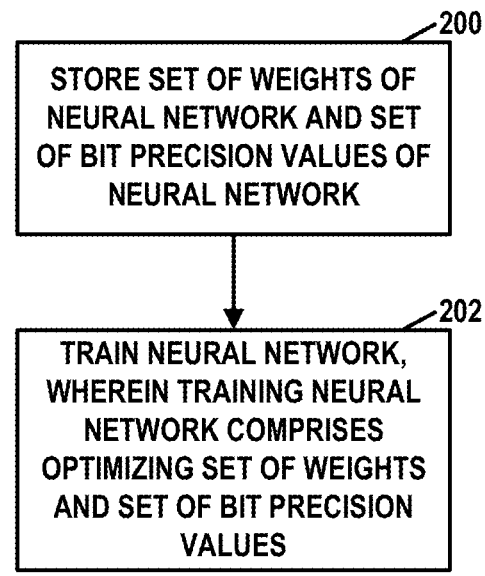
FIG. 2 is a flowchart illustrating an example operation of a BitNet deep neural network (DNN), in accordance with a technique of this disclosure.

FIG. 2 is a flowchart illustrating an example operation of a BitNet DNN, in accordance with a technique of this disclosure. In the example of FIG. 2, memory 102 stores a set of weights of DNN 106 and a set of bit precision values of DNN 106 (200). DNN 106 includes a plurality of layers 108. For each layer of the plurality of layers 108, the set of weights includes weights of the layer and the set of bit precision values includes a bit precision value of the layer. The weights of the layer are represented in memory 102 using values having bit precisions equal to the bit precision value of the layer. For example, if the bit precision of the layer is equal to 5, then each of the weights of the layer may be represented using a five bit index (e.g., as an integer having five bits), an offset value α, and a quantization step size value δ as shown in equation (30), above. In this example, memory 102 may only store one copy of the offset value α and one copy of the quantization step size value δ for each layer. In an example where the weights are constrained to integer powers of 2, the weights for each layer may be represented in memory 102 using exponent values having bit precisions equal to the bit precision value of the layer. The weights of the layer are associated with inputs to neurons of the layer.

Furthermore, in the example of FIG. 2, machine learning system 104 may train DNN 106 (202). Training DNN 106 comprises optimizing the set of weights and the set of bit precision values. Thus, the bit precision values are updated during training of DNN 106. As a result, two or more of layers 108 of DNN 106 may have different bit precisions. In some examples, all of layers 108 of DNN 106 have different bit precisions.

As part of training DNN 106, machine learning system 104 may apply a backpropagation algorithm over a plurality of iterations. Each iteration of the backpropagation algorithm may update the set of weights and also optimize the set of bit precision values. Example details of the backpropagation algorithm and optimization of the bit precisions are provided with respect to FIG. 3.

Figure 3:
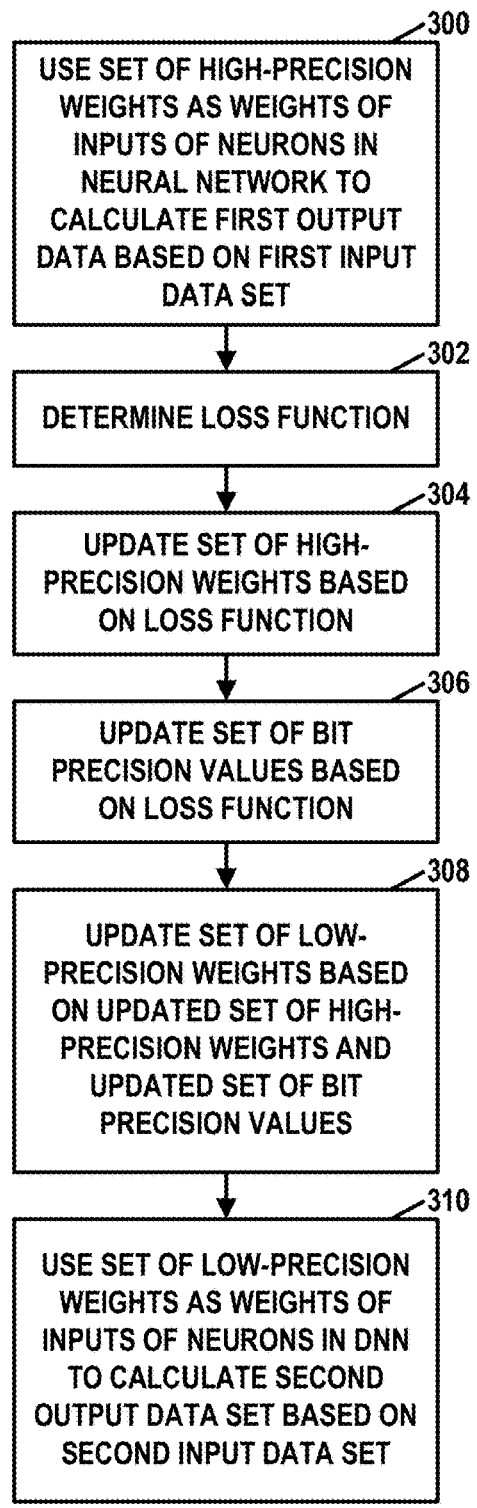
FIG. 3 is a flowchart illustrating an example operation for training a DNN in accordance with a technique of this disclosure.

FIG. 3 is a flowchart illustrating an example operation for training DNN 106 in accordance with a technique of this disclosure. As mentioned above, machine learning system 104 may perform a plurality of iterations to train DNN 106. As described below, machine learning system 104 may perform actions (300)-(308) of FIG. 3 for each of iteration of the plurality of iterations.

In the context of FIG. 3, the set of low-precision weights 116 (FIG. 1) mentioned above is a first set of weights ($\tilde{W}$). During training, memory 102 may also store a second set of weights (W) (i.e., high-precision weights 114 (FIG. 1)) that includes a fixed precision set of weights for each layer in the plurality of layers. Each weight in the set of high-precision weights 114 may have a bit precision equal to a predefined maximum bit precision value (e.g., 32 bits, 16 bits, etc.). The set of low-precision weights ($\tilde{W}$) (i.e., low-precision weights 116) includes a precision-optimized set of weights for each layer in the plurality of layers. In some examples, such as Equation (30), each weight in the set of low-precision weights 116 is an integer. In some examples, each weight in the set of low-precision weights 116 is a power of 2. A set of bit precision values (b) (i.e., bit precision values 118 (FIG. 1)) includes a bit precision value for each layer in the plurality of layers. For each layer of the plurality of layers, each weight in the precision-optimized set of weights ($\tilde{W}$) for the layer may be represented in memory 102 using a value having a bit precision equal to the bit precision value for the layer. As part of performing the plurality of iterations to train DNN 106, machine learning system 104 may perform actions (300) through (308) for each iteration of the plurality of iterations.

Particularly, in the example of FIG. 3, machine learning system 104 may use the set of high-precision weights as weights of inputs of neurons in DNN 106 to calculate a first output data set based on a first input data set (300). For instance, machine learning system 104 may calculate output values of each artificial neuron in DNN 106 according to Equation (1), above, or another activation function, using the second set of weights as weights w. The first output data set may be the output y of the output layer 108N of DNN 106.

Figure 4:
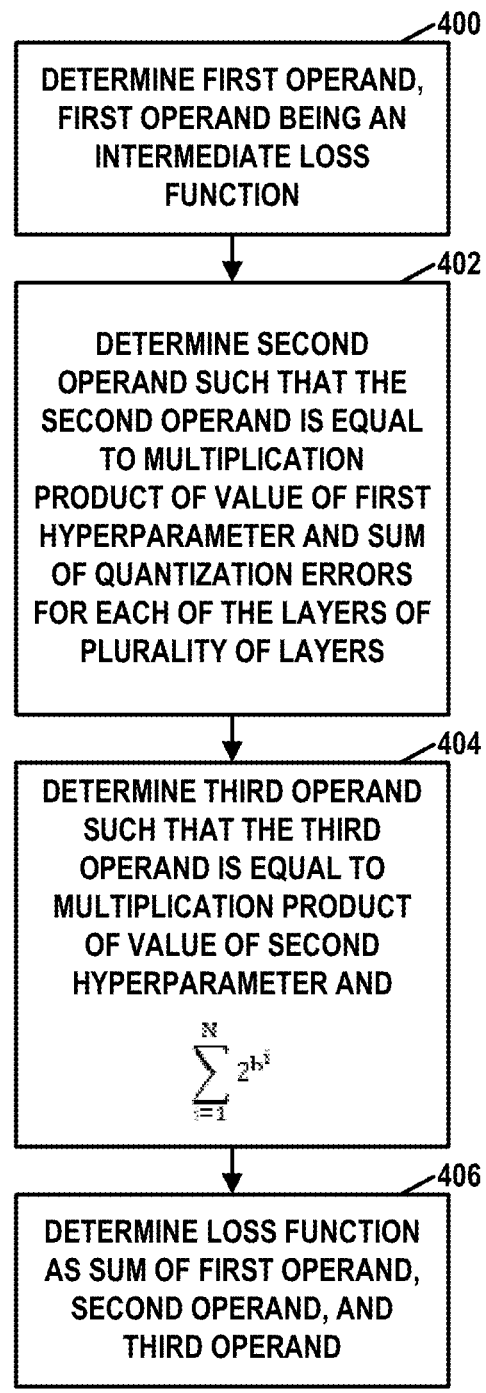
FIG. 4 is a flowchart illustrating an example operation to determine a loss function in accordance with a technique of this disclosure.

Additionally, machine learning system 104 may determine a loss function (302). For instance, machine learning system 104 may determine the loss function based on a data-label pair, the first output data set, the set of bit precision values 118, high-precision weights 114, and the set of hyperparameters 120. The data-label pair includes the first input data set and a label. FIG. 4, described in detail below, is a flowchart illustrating an example operation to determine the loss function. In other examples, the loss function may be determined in different ways. For instance, the loss function may include one or more additional factors, e.g., as described elsewhere in this disclosure.

Furthermore, in the example of FIG. 3, machine learning system 104 updates the set of high-precision weights 114 based on the loss function (304). For instance, machine learning system 104 may update the set of high-precision weights 114 (W) as shown in Equation (22). Thus, machine learning system 104 may determine the updated set of high-precision weights 114 such that the updated set of high-precision weights 114 is set equal to:

$$W \leftarrow W - \mu \cdot \left(\frac{\partial l(\tilde{W})}{\partial W}\right)$$

where W is the set of high-precision weights 114, µ is a learning rate, $\tilde{W}$ is the set of low-precision weights 116, and $$\frac{\partial l(\tilde{W})}{\partial W}$$

is a partial derivative of the loss function with respect to the set of high-precision weights 114.

Furthermore, machine learning system 104 may update the set of bit precision values (306). For instance, machine learning system 104 may update the set of bit precision values 118 based on a loss function, such as the loss function shown in Equation (23). Thus, machine learning system 104 may determine the updated set of bit precision values 118 such that the updated set of bit precision values 118 is set equal to:

$$b - \mu \cdot \text{sign}\left(\frac{\partial l(\tilde{W})}{\partial b}\right)$$

where b is the set of bit precision values 118, µ is a learning rate, $\tilde{W}$ is the set of low-precision weights 116, and $$\frac{\partial l(\tilde{W})}{\partial b}$$

is a partial derivative of the loss function with respect to the set of bit precision values 118, and sign(•) is a function that returns a sign of an argument of the function unless an absolute value of the argument of the function is less than a predetermined threshold in which case the function returns 0.

In some examples, such as examples where the low-precision weights 116 are constrained to integer powers of 2, machine learning system may update the set of bit precision values 118 based on equations (25) through (29). Thus, machine learning system 104 determine an updated first parameter for the layer such that the updated first parameter for the layer is set equal to:

$$\theta_1 \leftarrow \theta_1 - \mu \frac{\partial l(\tilde{W})}{\partial \theta_1}$$

where $\theta_1$ is the first parameter for the layer, µ is a learning rate and $$\frac{\partial l(\tilde{W})}{\partial \theta_1}$$

is a partial derivative of the loss function with respect to $\theta_1$. Additionally, machine learning system 104 may determine an updated second parameter for the layer such that the updated second parameter for the layer is set equal to:

$$\theta_2 \leftarrow \theta_2 - \mu\frac{\partial l(\tilde{W})}{\partial \theta_2}$$

where $\theta_2$ is the second parameter for the layer, µ is a learning rate and $$\frac{\partial l(\tilde{W})}{\partial \theta_2}$$

is a partial derivative of the loss function with respect to $\theta_2$. In this example, machine learning system 104 may determine a set of quantized weights for the layer by applying a quantization function $\theta_1 + \theta_2 \log_2|w|$, where w denotes weights in the second set of weights that are associated with the layer. Machine learning system 104 may then determine a maximum weight in the set of quantized weights for the layer and a minimum weight in the set of quantized weights for the layer. Machine learning system 104 may set the bit precision values of the layer based on a log base 2 of a range defined by the maximum weight in the set of quantized weights and the minimum weight in the set of quantized weights (e.g., as shown in equation (29)).

After updating the set of high-precision weights 114 (W) and after updating the set of bit precision values 118, machine learning system 104 may update the set of low-precision weights 116 ($\tilde{W}$) based on the updated set of high-precision weights 114 (W) and the updated set of bit precision values 118 (308). For instance, machine learning system 104 may update the set of low-precision weights 116 ($\tilde{W}$) as shown in Equation (13). Thus, machine learning system 104 may determine an updated set of low-precision weights 116 such that, for each layer of the plurality of layers, updated precision-optimized weights for the layer are set equal to:

$$\alpha + \delta \times \text{round}\left(\frac{W - \alpha}{\delta}\right)$$

where α is a minimum weight in the fixed precision set of weights (i.e., set of high-precision weights 114) for the layer, W is the fixed-precision set of weights for the layer, and δ is a total number of fixed steps in a discretized range from the minimum weight in the fixed precision set of weights for the layer to a maximum weight in the second, fixed-precision set of weights for the layer, and round(•) is a rounding function. In this example, δ may be equal $$\frac{\beta - \alpha}{2^b},$$

where β is the maximum weight in the fixed precision set of weights for the layer and b is the bit precision value for the layer.

In some examples where the set of low-precision weights 116 are constrained to be integer powers of 2, machine learning system 104 may determine, for each weight of the set of low-precision weights 116, the weight of the set of low-precision weights 116 to be equal to a sign value multiplied by 2 to the power of an exponent value. In this example, the sign value indicates a sign of a corresponding weight in the set of high-precision weights 114. In this example, the exponent value is based on a log base 2 of the corresponding weight in the set of high-precision weights 114. For instance, machine learning system 104 may determine the updated set of low-precision weights 116 as shown in equation (19).

Separate from the training process, machine learning system 104 may use the set of low-precision weights 116 ($\tilde{W}$) as the weights of the inputs of the neurons in DNN 106 to calculate a second output data set based on a second input data set (310). In other words, machine learning system 104 may use the second input data to generate output data. For instance, machine learning system 104 may use the set of low-precision weights 116 as the weights of the inputs of the neurons in DNN 106 during evaluation mode to calculate output data based on input data.

In some examples of this disclosure, and in reference to FIG. 2, the training of the neural network (202) may result in the low-precision weights 116 of DNN 106 being equal to powers-of-two. In examples where low-precision weights 116 are equal to powers-of-two, computation during inference mode can be simplified with logical shifts operations instead of multiplication operations. This may result in DNN 106 operating more efficiently and potentially with lower latency in inference mode because shift operations are less complex than multiplications. In one example and with reference to FIG. 3, BitNet training can constrain weights to be integer powers-of-two during actions (300) through (308). For example, during the action (308), machine learning system 104 may update low-precision weights 116 such that the values of low-precision weights 116 are integer powers-of-two, which in turn, during the action (310), the set of low-precision weights 116 are used as weights of inputs of neurons in the neural network.

The selection of values that are integer powers-of-two, e.g. in the action (308), represents a quantization of selected weights. To better match the distribution of values between the high precision and Bitnet-trained neural network, the BitNet training can select a quantization function that best preserves the encoded distribution of the learned weight parameters, even if the quantization is non-differentiable. For example, in action (308), machine learning system 104 may use a quantization function, $\text{sign}(w)*2^{(round(log|w|))}$, where w is the original floating point weight that is updated in action (306).

FIG. 4 is a flowchart illustrating an example operation to determine a loss function in accordance with a technique of this disclosure. In the example of FIG. 4, machine learning system 104 determines a first operand, l(W) (400). The first operand l(W) is an intermediate loss function. In some examples, the intermediate loss function is based on the data-label pair ($X^{(I)}$, y), the first output data ($X^{(I)}$), and the second set of weights (W). Equations (7) and (8) show examples of the intermediate loss function. Thus, the first input data set comprises a batch of training data-label pairs, and as part of determining the first operand, machine learning system 104 may determine the first operand such that the first operand is equal to:

$$-\frac{1}{B}\sum_{i=1}^{B}\log(X_{i,y_i}^{(N)})$$

where B is a total number of data-label pairs in the batch of data-label pairs, each label in the batch of data-label pairs is an element in a set of labels that includes B labels, i is an index, log(•) is a logarithm function, N is the total number of layers in the plurality of layers, $y_i$ is the i'th label in the set of labels, and $X_{i,y_i}^{(N)}$ is output of the N'th layer of the plurality of layers when DNN 106 is given as input the data of the i'th data-label pair of the batch of data-label pairs and DNN 106 uses the second set of weights. In this example, the data-label pairs in the batch of data-label pairs may be independent identically distributed data-label pairs. In some examples, the intermediate loss function may be any standard supervised or unsupervised loss function, for example, cross-entropy (or negative log-likelihood) for supervised classification, or reconstruction error for unsupervised auto-encoders. In one example where the intermediate loss function is a loss function, machine learning system 104 may calculate the first operand as shown in equation (33), below:

$$\|x-\hat{x}\|^2 \qquad (32)$$

In equation (33), x is input data and $\hat{x}$ is an output of DNN 106 using high-precision weights 114 (W).

Furthermore, in the example of FIG. 4, machine learning system 104 determines a second operand such that the second operand is equal to a multiplication product of a value of a hyperparameter ($\lambda_1$) and a sum of quantization errors for each of the layers in the plurality of layers $q(W^{(i)}, b^{(i)})$ (402). For instance, machine learning system 104 may calculate $\lambda_1 \Sigma_{i=1}^{n} q(W^{(i)}, b^{(i)})$ as shown in equation (20). For each layer of the plurality of layers, machine learning system 104 may determine the quantization errors for the layer based on differences between the high-precision set of weights for the layer (i.e., the second set of weights) and the low-precision set of weights for the layer (i.e., the first set of weights), as shown in equation (14). In some examples, such as examples where low-precision weights 116 ($\tilde{W}$) are constrained to integer powers of 2 and machine learning system 104 uses the loss function defined in equation (21), machine learning system 104 may determine the second operand as being equal to a value of a hyperparameter ($\lambda_1$) and a distillation loss, as described above, instead of determining the second operand as being a product of the value of the hyperparameter and the sum of quantization errors.

Additionally, in the example of FIG. 4, machine learning system 104 may determine a third operand such that the third operand is equal to a multiplication product of the value of a hyperparameter ($\lambda_2$) and $\Sigma_{i=1}^{N} 2^{b^i}$, where i is an index, N is a total number of layers in the plurality of layers, and $b^i$ is the bit precision value for the i'th layer in the plurality of layers (404). Machine learning system 104 may determine the loss function as the sum of the first operand, the second operand, and the third operand (406).

Figure 5:
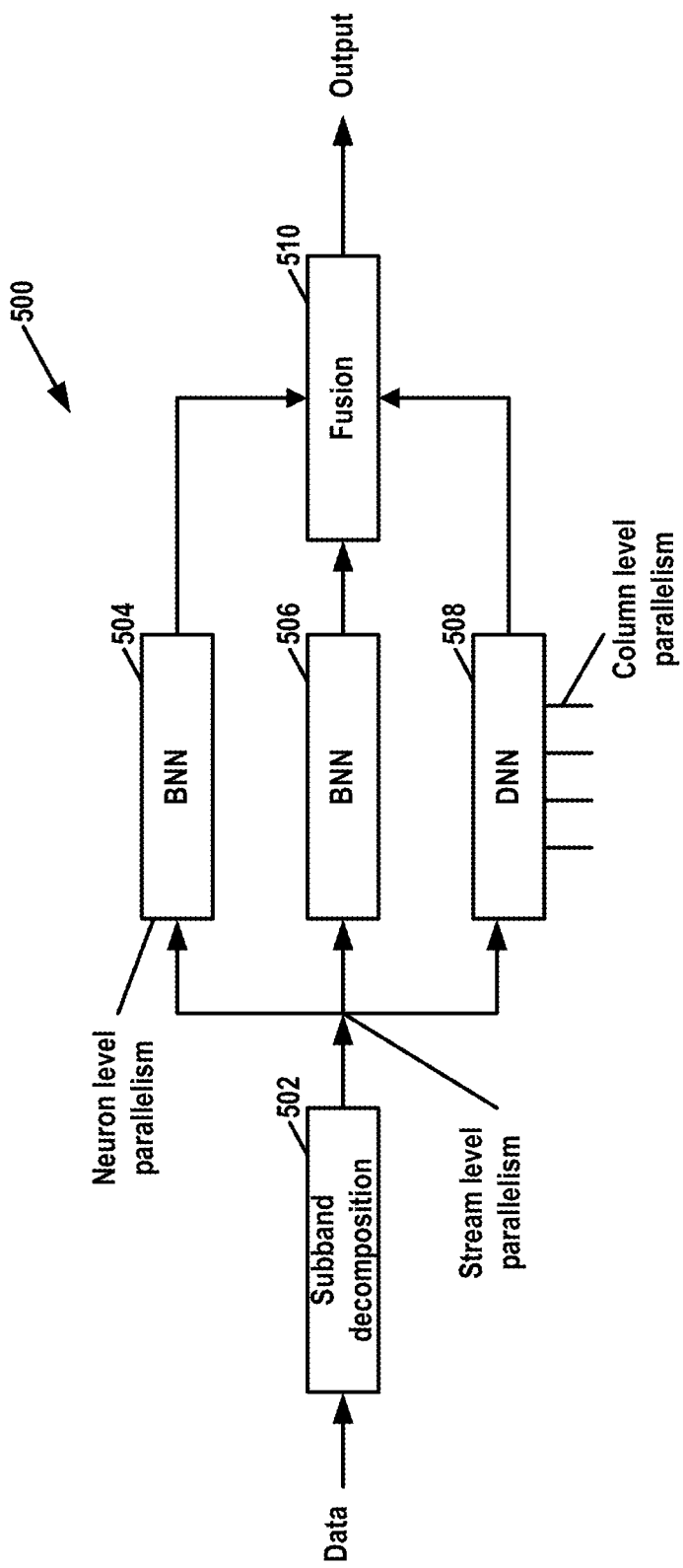
FIG. 5 is a block diagram illustrating an example heterogeneous neural architecture.

This disclosure describes techniques that manage DNN memory sizes, and at the same time, may provide new opportunities in neural network composition afforded by the low precision approaches described herein. FIG. 5 is a block diagram illustrating an example heterogeneous neural architecture. The heterogeneous neural architecture of FIG. 5 highlights new areas of neural network composition that may be afforded by the low precision approaches of this disclosure. In the example of FIG. 5, a system 500 includes a sub-band decomposition unit 502, a binary neural network (BNN) 504, a BNN 506, a DNN 508, and a fusion unit 510. Sub-band decomposition unit 502 receives input data. BNN 504, BNN 506, and DNN 508 receive the output of sub-band decomposition unit 502 as input. Fusion unit 510 may receive the output of BNN 504, BNN 506, and DNN 508 as input. Fusion unit 510 generates output. Machine learning system 104 (FIG. 1) may implement each of sub-band decomposition unit 502, BNN 504, BNN 506, DNN 508, and fusion unit 510.

BNNs are a class of neural networks that use only a single bit precision to represent synaptic weights and activations. This may represent a significant savings in processing because the computing architecture does not need multiplications and the amount of memory usage is dramatically reduced. BNNs have previously been applied for object detection and classification. In inference mode, a BNN runs without the need for multiply-accumulate hardware and with 32 times less run-time memory footprint. To give a perspective, the AlexNet CNN would use only 0.25 Watts with a speedup of 23× using bit-wise operations.

Sub-band decomposition unit 502 may decompose an image into different frequency bands such that each band can be processed in DNNs of lower precision, such as BNN 504, BNN 506, and DNN 508. By separating images into high and low frequency bands, DNNs can process edge and textures separately. Decomposition may rely on pre-processing the input data into different sub-bands, in a process that separates the information content, much like wavelet decomposition. This process may include other forms of data preprocessing, for example, data augmentation, where images are rotated, mirrored, and contrast adjusted.

The process of sub-band decomposition may enable a neural network composition where each sub-band can be processed by a different DNN in parallel. With this approach, sub-band decomposition unit 502 may decompose the input data into multiple parallel streams. In accordance with a technique of this disclosure, machine learning system 104 may select each sub-band to optimize memory and computational needs, based on the basic premise is that each sub-band is more "optimal" from the learning perspective. Each sub-band may be optimized from a bit-precision perspective. There is a cost of pre-processing the input data, with savings on lowering the precision of each processed sub-band.

As described elsewhere in this disclosure, it can be advantageous from an algorithm performance perspective to train a DNN with bit precision itself as hyperparameter. The resulting DNN 508 may have different bit precision for each layer of DNN 508. Other approaches such as quantization and rounding of DNN weights may not only suffer lower algorithmic performance, but all weight values are treated globally and with the same precision (e.g., 32 bits, 16 bits, 8 bits, etc.). Similarly, BNNs may be trained such that the minimum bit setting is applied a homogeneously setting DNN layers. The amount savings in memory size may be dependent on the algorithmic task (e.g., number of features and object classes).

In the example of FIG. 5, fusion unit 510 may generate output data based on the output data generated by one or more of BNN 504, BNN 506, and DNN 508. In some examples, fusion unit 510 may be another DNN. In some examples, fusion unit 510 may be a program that does not use a DNN. In this way, FIG. 5 shows an example embodiment composed of neural networks where each neural network (BNN 504, BNN 506, DNN 508, fusion unit 510) may be optimized from learning perspective and from a resource usage perspective (e.g., bit-precision to control overall memory storage and compute hardware).

The following section of this disclosure shows that a BitNet DNN, such as DNN 106 (FIG. 1) may support a faster learning rate (e.g., converge faster) and can arrive at a configuration of DNN weights that may have higher performance than a standard DNN. Using the bit-precision, machine learning system 104 may be able to guide the learning with a more directed goal (e.g., within the number of values that can be selected for the weights). For instance, machine learning system 104 may be better able to regulate the training process because BitNet training can better able to guide the allowable range of values for the neural network weights. In comparison, standard high precision approach may have too wide a range of values that can be selected for the weights and therefore, may take longer in the training process to arrive at the appropriate values. In some examples, machine learning system 104 starts with lower precision and gradually increases bit precision in order to converge faster to a solution, thereby reducing overall training time. For instance, machine learning system 104 may initially use a relatively high value of $\lambda_2$ as compared to a value of $\lambda_1$ in Equation (20) and then gradually decrease the value of $\lambda_2$ relative to the value of $\lambda_1$.

BitNet DNNs have been evaluated on two popular benchmarks for image recognition and classification namely MNIST and CIFAR-10. For purposes of explanation, simple neural architectures based on the LeNet-5 architecture were used without training for many epochs, and it was not necessary for the BitNet DNNs to give state-of-the-art performance. Rather, emphasis was on comparing BitNet DNNs to the corresponding high-precision implementations, particularly to identical CNNs with 32-bit parameters, which this disclosure dubs as "LeNet.FP32." No preprocessing or data augmentation was performed for the same reason. A simple form of batch normalization (also known as centering) was performed on the inputs to circumvent covariate shift across batches. The automatic differentiation provided in Theano was used for calculating gradients with respect to Equations (22) and (23).

The MNIST database of handwritten digits has a total of 70,000 grayscale images of size 28×28. Each image consists of one digit among 0,1, . . . , 9. The data was split into 50,000 training, 10,000 testing and 10,000 validation examples. The digits were size-normalized and centered in a fixed-size image. This training data was split into batches of 250 images. The baseline architecture for this dataset consists of two convolutional layers, each consisting of 30 and 50 5×5 filters respectively, each followed by a 4×4 pooling. The filtered images were fed into a hidden layer of 500 hidden units (i.e., artificial neurons), followed by a softmax layer to output scores over 10 labels.

The CIFAR-10 dataset consists of 60,000 32×32 color images in 10 classes, with 6,000 images per class corresponding to object prototypes such as 'cat', 'dog', 'airplane', 'bird', etc. 40,000 images were used for training and 10,000 images each for testing and validation respectively. The training data was split into batches of 250 images. The baseline architecture for this dataset consists of two convolutional layers, each consisting of 30 and 50 3×3 filters respectively, each followed by a 2×2 pooling layer, respectively. The filtered images are fed into a hidden layer of 500 hidden units, followed by a softmax layer to output scores over 10 labels.

FIG. 6A and FIG. 6B illustrate example performance of BitNet and LeNet-FP32. That is, FIG. 6A and FIG. 6B show performance of BitNet in comparison to LeNet-FP32 on the MNIST and CIFAR-10 datasets. The left panels of each of FIG. 6A and FIG. 6B show the validation error % and the right panel shows the negative log likelihood over training iterations. In FIG. 6A and FIG. 6B, the final validation error is shown in parenthesis. Furthermore, in FIG. 6A and FIG. 6B, the learning rate, μ is halved after each epoch that is 250 iterations for MNIST and 200 iterations for CIFAR-10.

As shown in FIG. 6A and FIG. 6B, the regularization in BitNet may lead to significantly faster learning. In the left panels of FIG. 6A and FIG. 6B, the validation error of BitNet reduces more rapidly than LeNet-FP32. The validation error of the resulting BitNet after 100 epochs is 2% lower than LeNet-FP32. Similarly, BitNet achieves an error of 5.25% on the test set, whereas LeNet-FP32 achieves error 7.3%. For a given performance, BitNet takes roughly half as many iterations as the baseline. The right panels of FIG. 6A and FIG. 6B show that the training error with respect to the high precision parameters also decreases at a faster rate for BitNet than LeNet-FP32, showing that the lower validation error is not caused by quantization alone. In addition to the superior performance, BitNet only uses an average of 6 bits per layer corresponding to a 5.33× compression over LeNet-FP32.

Figure 7:
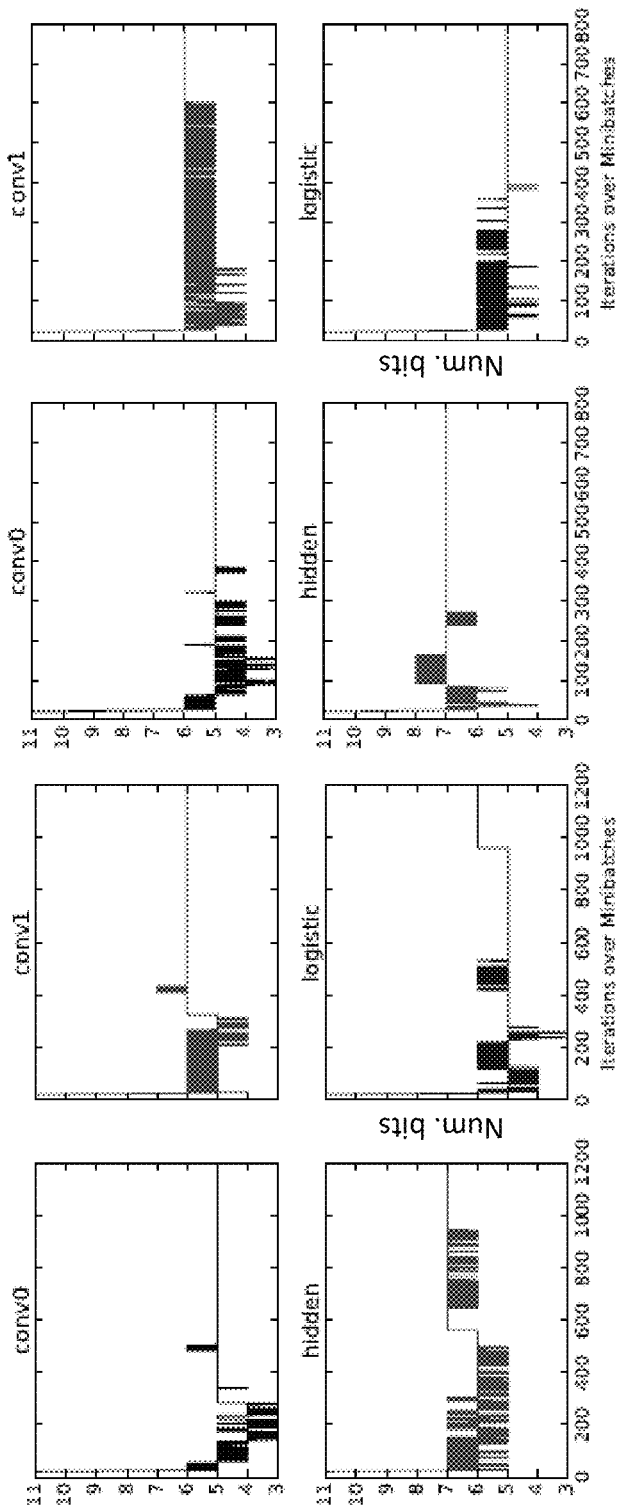
FIG. 7 illustrates a number of bits used for representing the parameters of each layer of a CNN.

FIG. 7 illustrates a number of bits used for representing the parameters of each layer of a CNN. That is, FIG. 7 shows the change in the number of bits over training iterations. It can be seen that the number of bits converges within the first five epochs. It can also be observed that the gradient with respect to the bits quickly goes to zero.

In one experiment, the impact of the hyperparameters in Equation (20) (i.e., $\lambda_1$ and $\lambda_2$) is shown. In this experiment, each CNN is trained for 30 epochs only. FIG. 8A and FIG. 8B show the impact on performance and compression on the MNIST and CIFAR-10 data, respectively. In other words, FIG. 8A and FIG. 8B show sensitivity of the test error and compression ratio to the hyperparameters for BitNet for the MNIST and CIFAR-10 datasets, respectively. With respect to FIG. 8A and FIG. 8B, the compression ratio is defined as the ratio of the total number of bits used by LeNet-FP32 (=32×4) to the total number of bits used by BitNet. In both the datasets, on one hand when $\lambda_2$=0 and $\lambda_1$=1, BitNet uses 32-bits that are evenly spaced between the range of parameter values, we see that the range preserving linear transform in Equation (11) leads to significantly better test error compared to LeNet-FP32 that also uses 32 bits, which is non-linear and is not sensitive to the range. For MNIST, in the left panel of FIG. 8A, BitNet with $\lambda_2$=0, $\lambda_1$=1, thus using 32 bits, achieves a test error of 11.18%, compared to the 19.95% error of LeNet-FP32, and to the 11% error of BitNet with the best settings of $\lambda_1$=$10^{-7}$, $\lambda_2$=$10^{-3}$. As shown in FIG. 8B, the same observation holds true in the CIFAR-10 dataset.

On the other hand, when $\lambda_1$=0 and $\lambda_2$=1, BitNet uses only 2-bits per layer, with a test error of 13.09% in MNIST, a small degradation in exchange for a 16× compression. This approach provides some flexibility in limiting the bit-width of parameters and gives an alternative way of arriving at the binary or ternary networks studied in previous work.

For any fixed value of $\lambda_1$, increasing the value of $\lambda_2$ leads to fewer bits, more compression and a slight degradation in performance. For any fixed value of $\lambda_2$, increasing the value of $\lambda_1$ leads to more bits and lesser compression. There is much more variation in the compression ratio in comparison to the test error. In fact, most of the settings tested led to a similar test error but vastly different numbers of bits per layer. The best settings were found by a grid search such that both compression and accuracy were maximized. In MNIST and CIFAR-10, this was $\lambda_1=10^{-7}$, $\lambda_2=10^{-3}$.

In one experiment, more layers were added to the CNN and the impact of bit regularization on the performance and compression was evaluated. There are two primary difficulties in training DNNs. Firstly, the large number of parameters require increasing amounts of data and training time. The second issue with very deep neural networks is overfitting to the training data, which can be seen via increasing test error with increasing layers. We show that bit regularization helps to train deep networks without overfitting. The space of possible architectures and layers that can be added is intractable. We show a sample of a sequence of layers that can be added incrementally such that the performance improves. These layers were selected by hand using intuition and some experimentation.

Table 1 shows the results for the MNIST dataset at the end of 30 epochs.

observed that the test error is reduced by additional convolutional as well as dense layers. The addition of 1×1 filters (corresponding to global scaling) may reduce the test error as well, while not increasing the number of parameters in comparison to the addition of dense layers.

A similar comparison for the CIFAR-10 dataset is shown in Table 1 after 100 epochs of training. There is no evidence of overfitting because in each experiment both the training and test error are decreasing. As the architecture becomes more complex, a small drop in performance is seen, which can be attributed to the reduction in the number of total parameters, as well as training for a fixed 100 epochs. As in the previous experiment, it is seen that the compression ratio is not significantly affected by the architecture. These are not state-of-the-art results for CIFAR-10. However, a focus of BitNet is on anytime performance: i.e., each of these experiments run for about an hour, in comparison to about 20 hours to get state-of-the-art results.

TABLE 1

| # | Test Error % | Num. Params. | Compr. Ratio | 30 1×1 1×1 | 30 3×3 1×1 | 30 3×3 2×2 | 30 5×5 4×4 | 50 5×5 4×4 | Dense 500 Nodes | Dense 500 Nodes | Classify 10 Labels |
|---|---|---|---|---|---|---|---|---|---|---|---|
| | | | | | MNIST | | | | | | |
| 4 | 11.16 | 268K | 6.7 | | | | 5 | 6 | 7 | | 6 |
| 5 | 10.46 | 165K | 5.72 | | | 5 | 6 | 6 | 6 | | 5 |
| 6 | 9.12 | 173K | 5.65 | | 5 | 6 | 6 | 6 | 6 | | 5 |
| 7 | 8.35 | 181K | 5.75 | 5 | 5 | 6 | 6 | 6 | 6 | | 5 |
| 8 | 7.21 | 431K | 5.57 | 5 | 6 | 5 | 6 | 6 | 6 | 7 | 5 |
| | | | | | CIFAR-10 | | | | | | |
| 4 | 42.08 | 2.0M | 5.57 | | | 5 | 6 | | 7 | | 5 |
| 5 | 43.72 | 666K | 5.52 | | | 5 | 6 | 6 | 7 | | 5 |
| 6 | 43.32 | 949K | 5.49 | | 5 | 5 | 6 | 6 | 7 | | 6 |
| 7 | 42.83 | 957K | 5.74 | 4 | 5 | 6 | 6 | 6 | 7 | | 5 |
| 8 | 41.23 | 1.2M | 5.57 | 4 | 5 | 6 | 6 | 6 | 7 | 7 | 5 |

Table 1 shows the performance of BitNet at the end of 30 epochs on MNIST and at the end of 100 epochs on CIFAR-10 with increasing complexity of the neural architecture. The first column of Table 1 (#) denotes the number of total layers. Test error is evaluated on a test set (i.e., data that was not seen by DNN 106 during training) and the error measure is the fraction of incorrect answers. The compression ratio (Compr. Ratio) is the ratio to the average number of bits used by BitNet. The columns to the right of the compression ratio specify the architecture and the number of bits in the final BitNet model. In each table, the last row contains the full architecture, where the columns read left to right is the neural architecture. In rows above the last row, some of these layers are omitted to train a smaller DNN. The heads have the format of P-Q-R where P is the number of convolutional filters, Q is the size of each filter, R is the size of the max pooling that is done after filtering. In the case of Dense layers (i.e., fully-connected layers), it just means the number of neurons. The column heading for a convolutional layer specifies the number of filters, the spatial domain and the pooling size. Here $\lambda_1=10^{-7}$ and $\lambda_2=10^{-4}$.

Figure 9:
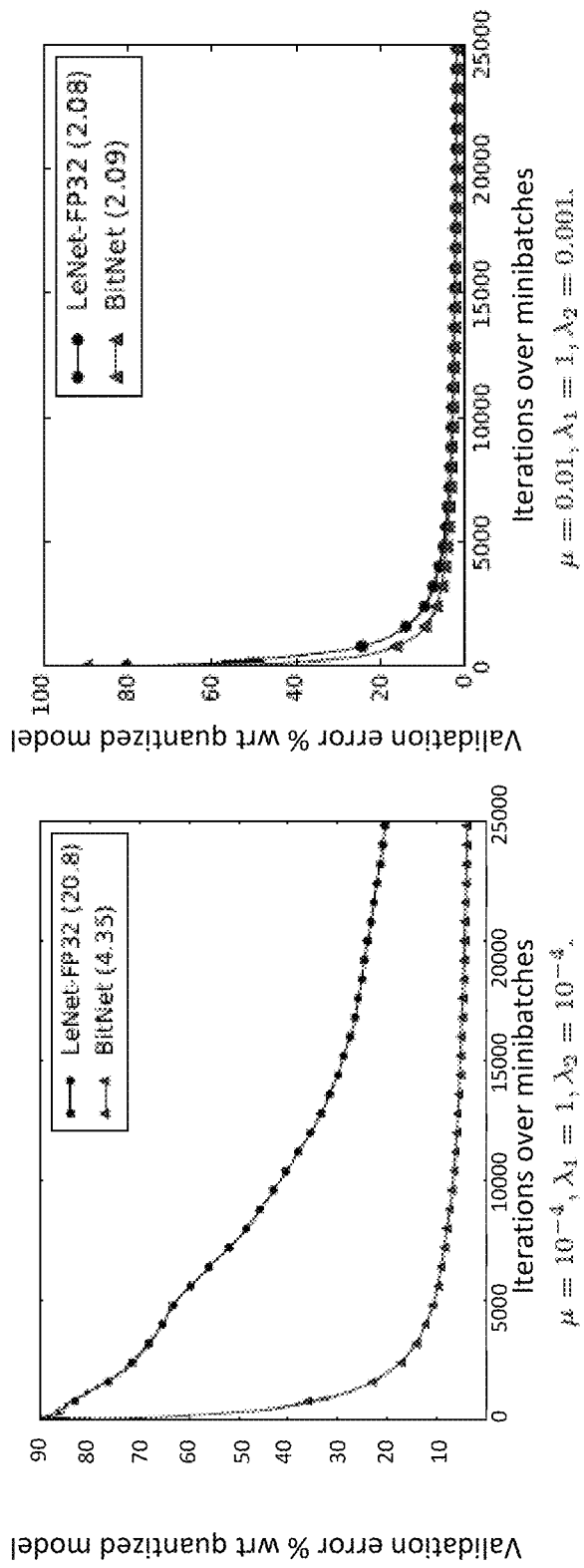
FIG. 9 shows validation error percentage versus iterations of BitNet compared to LeNet-FP32 over minibatches.
Figure 10:
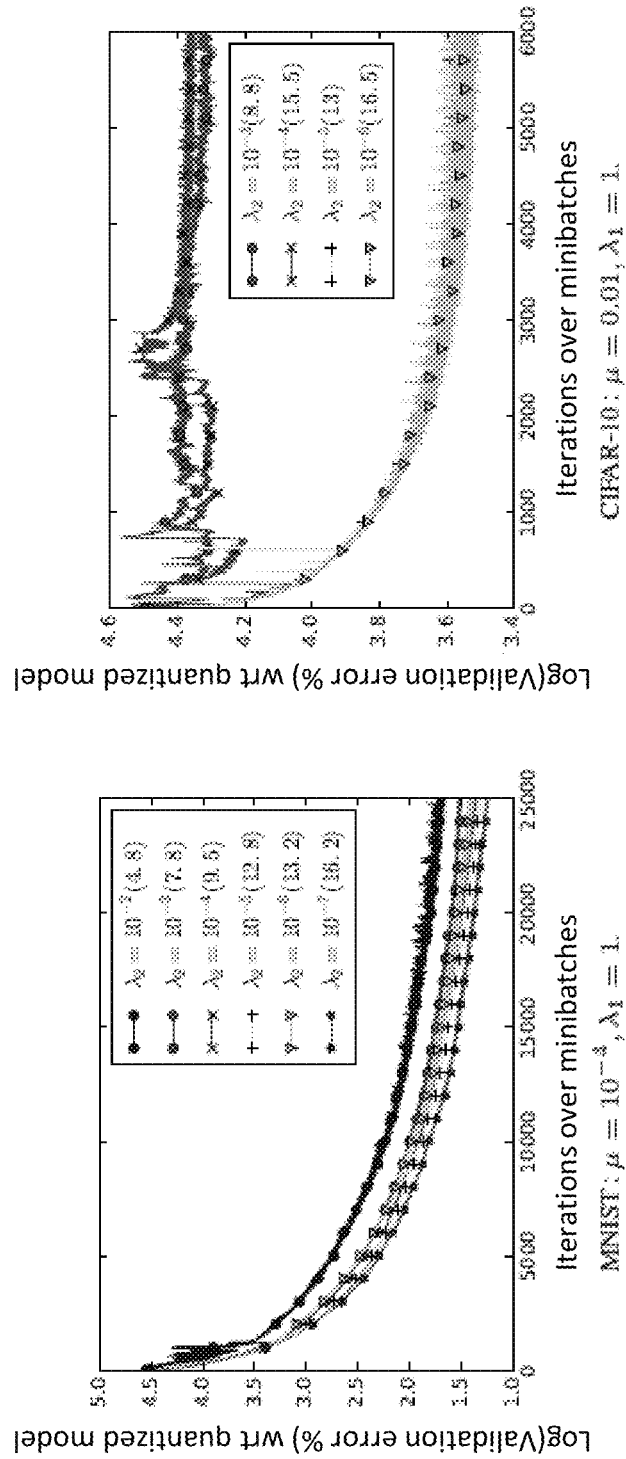
FIG. 10 illustrates example performance of BitNet over different coefficients for linear bit penalty for the MNIST and CIFAR-10 datasets.

Initially, the BitNet started with four layers, whose performance was shown in the previous section. First, it is observed that the test error decreases steadily without any evidence of overfilling. Second, it is observed that the number of bits and the compression ratio are not affected significantly by the architecture and seem to be a strong function of the data and hyperparameters. Third, it is In one experiment, it is shown that the property of accelerated learning in BitNet is indirectly related to the learning rate. For this purpose, a linear penalty is used for the number of bits instead of the exponential penalty (third term) in Equation (20). FIG. 9 shows an example of the performance of BitNet on the MNIST dataset. Particularly, FIG. 9 shows validation error percentage versus iterations of BitNet compared to LeNet-FP32 over minibatches. The final validation error is shown in parenthesis in FIG. 9. In the example of FIG. 9, the learning rate $\mu$ is multiplied by 0.1 after every epoch. The left panel of FIG. 9 shows that BitNet may exhibit faster learning similar to using exponential penalty. The panel on the right of FIG. 9 shows that the baseline LeNet-FP32 is also able to learn at a similar rate as BitNet when the learning rate is increased. This point is illustrated further in FIG. 10 where different values of $\lambda_2$, the coefficient for the linear number of bits, shows a direct relationship with the rate of learning. FIG. 10 illustrates example performance of BitNet over different coefficients for linear bit penalty for the MNIST and CIFAR-10 datasets. Specifically, the right panel of FIG. 10 shows that larger values of $\lambda_2$ leads to instability and poor performance, whereas a smaller value of $\lambda_2$ leads to a smooth learning curve.

However, increasing the learning rate globally for all the parameters of the CNN in LeNet-FP32) is not as robust as the adaptive rate taken by each parameter as in BitNet. Furthermore, the learning oscillates especially if the learning rate is further increased. This establishes an interesting connection between low precision training, momentum or sophisticated gradient descent algorithms such as AdaGrad, which also address the issue of 'static' learning rate. AdaGrad is described in Duchi et al., "Adaptive Subgradient Methods for Online Learning and Stochastic Optimization," Journal of Machine Learning Research, pages 2121-2159, 12 Jul. 2011. Alternatively, one can view BitNet as training with noisy gradients, an approach shown to encourage robust learning with few probability distributions for the noise. The noise incorporated in to the gradients of BitNet is similar to a disjoint set of gaussians with equally spaced centers determined by W and b, whose number is determined by b and variance by the range of values in W.

The deployment of deep neural networks to real world applications is significantly limited by their compute and memory requirements. To summarize, this disclosure describes a flexible tool for training compact DNNs given an indirect specification of the total number of bits available on the target device. This disclosure presents a formulation that incorporates such constraints as a regularization on the traditional classification loss function. This formulation is based on controlling the expressive power of the network by dynamically quantizing the range and set of values that the parameters can take. The experiments described herein showed faster learning in terms of training and testing errors in comparison to an equivalent unregularized network. The robustness of our approach was also shown with increasing depth of the neural network and various hyperparameters. Our experiments showed that BitNet may have an indirect relationship to the global learning rate. BitNet can be interpreted as having a dynamic learning rate per parameter that depends on the number of bits. In that sense, bit regularization is related to dynamic learning rate schedulers such as AdaGrad. In some examples, machine learning system 104 may anneal the constraints to leverage fast initial learning combined with high precision fine tuning. In that sense, BitNet can be interpreted as having a joint-optimization to learn a representation of the training data and system architecture.

The previous section of this disclosure described methods to train a DNNs such that the bit precision is part of the parameters in the training procedure. In other words, the previous section of this disclosure described optimization of bit precision as part of the training phase. The resulting DNN may have different bit precisions for the different DNN layers. Benefits may include lower memory footprint, faster learning, and potentially higher algorithmic performance.

The next section of this disclosure presents additional details related to processing embodiments and their relationships to training and inference. In particular, this disclosure describes (1) how system architecture parameters may be used within BitNet selection of DNN compositions and (2) how system architecture parameters may be used to distribute processing for the trained DNN.

This disclosure uses the term "system architecture" to mean a set of the processing hardware (and associated software stack) to train one or more DNNs and/or execute the one or more DNNs in inference mode. In some examples, the processing hardware may include virtual machines that act like physical hardware. In some examples, a system architecture comprises one or more processors (e.g., CPUs, GPUs, FPGAs, DSPs, or virtualized representations thereof) that support training of BitNet DNNs. In some examples, the same system architecture can be used to run the trained DNN in inference mode. In some examples, an alternate system architecture can be used. For instance, one or more BitNet DNNs may be trained on a first system architecture (e.g., a cloud computing system) and then used in inference mode on a second, different system architecture (e.g., a mobile device). This disclosure uses the term neural network software architecture to mean a system composed of one or more DNNs and the compositions of those DNNs. For instance, a neural network software architecture may include multiple separate DNNs that may interact. In addition to the techniques described above, this disclosure describes techniques related to methods of DNN training in which system architecture inputs are used to select a composition the DNN model. Additional techniques of this disclosure include methods in which DNN processing (both training and inference) is distributed among processors in a system architecture.

Figure 11:
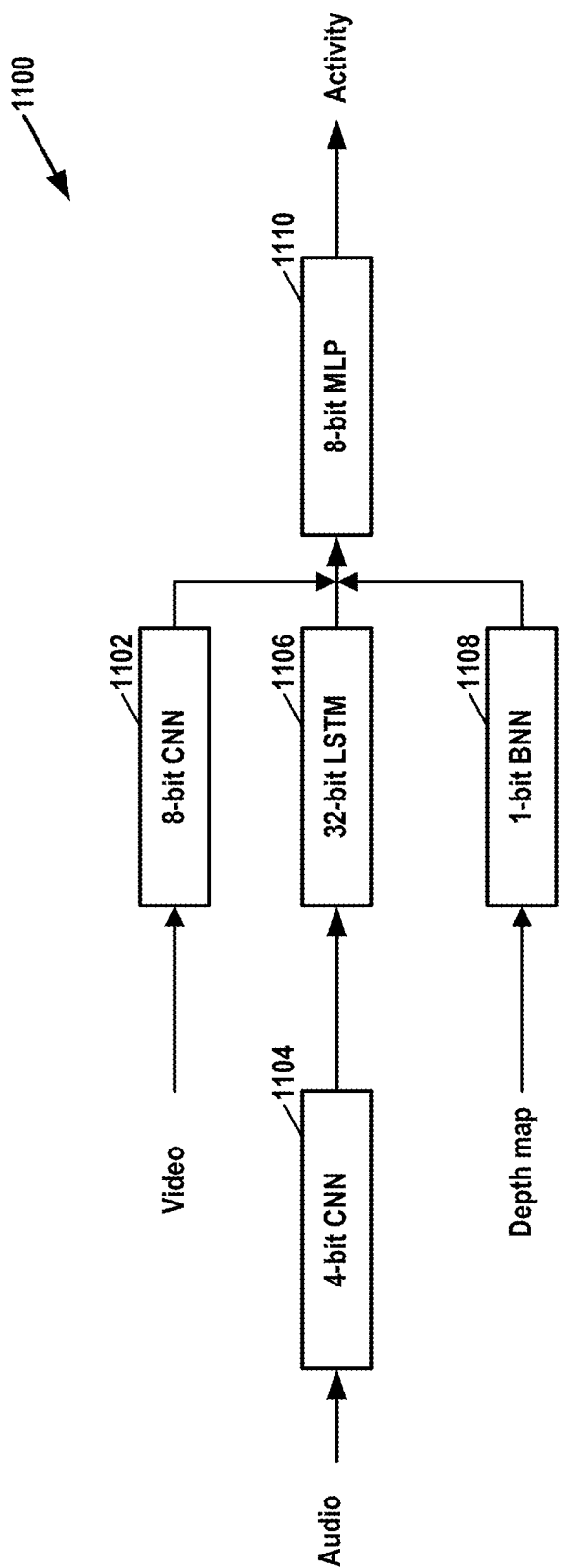
FIG. 11 is an example neural network software architecture composed of a hierarchy of layers.

FIG. 11 is an example neural network software architecture 1100 composed of a hierarchy of layers, where each of the layers is a DNN. That is, FIG. 11 shows an example neural network software architecture composed of a hierarchy of neural networks. In the example of FIG. 11, sensor inputs to neural network software architecture 1100 are video data, audio data, and a depth map. The output of neural network software architecture 1100 is a classification of an activity, detected from an analysis of the video, audio, and depth map. In one example, an application of neural network software architecture 1100 may be human gesture recognition. A human developer or a computing system may select neural network software architecture 1100.

Furthermore, in the example of FIG. 11, an 8-bit CNN 1102 is selected for the video data. In this example, the high-precision weights of CNN 1102 are each 8 bits. During training of CNN 1102, the precision-optimized weights of CNN 1102 may be updated to have bit precisions less than 8. A 4-bit CNN 1104 followed by a 32-bit LSTM (Long Short-Term Memory neural network) 1106 is selected for the audio data. In this example, the high-precision weights of CNN 1104 are each 4 bits and the high-precision weights of LSTM 1106 are each 32 bits. During training of CNN 1104 and LSTM 1106, the precision-optimized weights of CNN 1104 and LSTM 1106 may be updated to have bit precisions less than 4 and 32, respectively. A 1-bit BNN 1108 is selected for the depth map. In the example of FIG. 11, the three streams generated by CNN 1102, LSTM 1106, and BNN 1108 are fed into an 8-bit MLP (multi-layer perceptron) 1110 to generate the activity classification output. The high-precision weights of MLP 1110 may each be 8 bits. During training of MLP 1110, the precision-optimized weights of MLP 1110 may be updated to have bit precisions less than 8.

The video data may comprise 2-dimensional imagery with different color planes (red, green, blue), and are typically 8-bits per pixel. The audio data may comprise a single dimensional stream and are typically 16-bits per sample. Audio processing can include feature extraction (e.g., with CNN 1104) and then speech analysis (e.g., with LSTM 1106). The depth map may comprise a 2-dimensional mask with pixel values representing distance from a sensor (e.g., camera).

Figure 12:
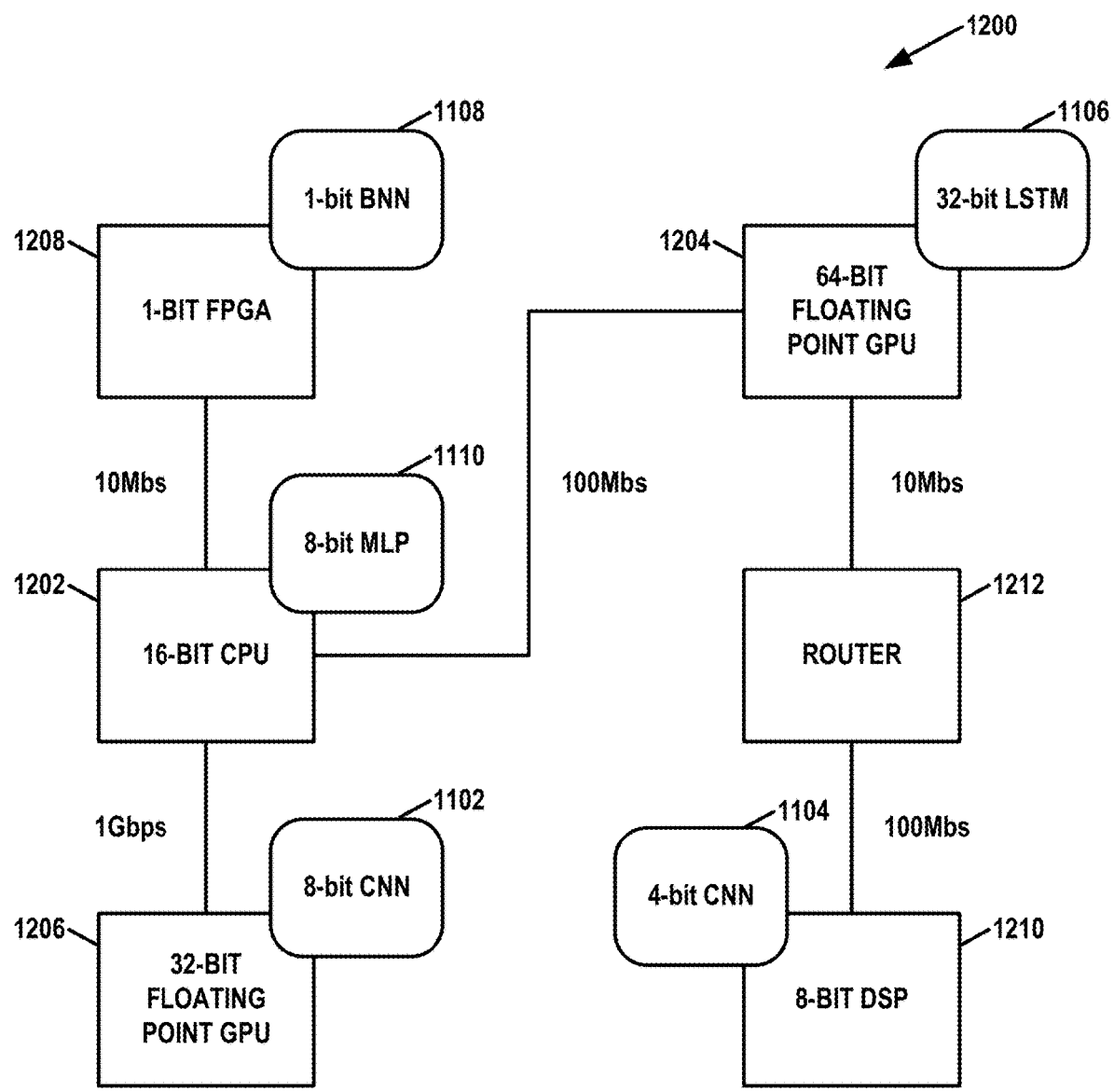
FIG. 12 is an example system architecture comprising a heterogeneous set of processors and an example mapping of a neural network software architecture to the system architecture resources.

FIG. 12 is an example system architecture 1200 comprising a heterogeneous set of processors. In the example of FIG. 12, the processors include a CPU 1202, a GPU 1204, a GPU 1206, a FPGA 1208, and a DSP 1210. Each processor has different bit-precision support. Example supported bit precisions may include 8-bit and 1-bit precision (integer) and 32-bit and 64-bit (floating point). The different processor hardware can process the DNN computation differently (e.g., with different levels of parallelism and organization of memory) to support different size, weight, and power (SWaP) offerings. The processors may be connected in a network. In the example of FIG. 12, each network connection has different bandwidth availability, for example, 10 Mbps, 100 Mbps, and 1 Gbps. In the example of FIG. 12, there is also a router 1212 that directs traffic but does not perform any computation for any DNN. The network bandwidth availability sets the communication limits between processors, and as such, may have an impact on how the DNNs are trained and processed during inference.

This disclosure describes a technique to select bit precision based on the system architecture capability. This disclosure uses the examples in FIG. 11 and FIG. 12 to illustrate this technique. Given the sensor data types that need to be analyzed, machine learning system 104 (FIG. 1) may first review the system architecture on which neural network software architecture 1100 needs to operate in inference mode. For example, machine learning system 104 may determine that, for a 1-bit BNN, the best processor would be an FPGA because FPGAs have fine grain programmable units that can support binary operations. In comparison, LSTMs may require higher precision because of its time series analysis. Machine learning system 104 may also consider the amount of network bandwidth required to support the communications between the different layers of the DNN. For example, video processing may require more communication bandwidth compared to audio processing. Other examples of system architecture parameters may include memory footprint (e.g., 1-bit BNN has a smaller memory requirement than 8-bit CNN).

The system architecture parameters are used to map the neural network software architecture to the appropriate processors in the system architecture. For instance, machine learning system 104 of computing system 100 (FIG. 1) map the neural network software architecture to appropriate processors in the system architecture. Machine learning system 104 may use a cost function to select the best mapping (e.g., a best fit algorithm can be use). The cost function can be one of size, weight, power and cost (SWaPC). For example, given the selection of an 8-bit CNN, machine learning system 104 may use the cost function to select a mapping that provides a lower system SWaPC. For instance, machine learning system 104 may evaluate various potential mappings of DNNs in a neural network software architecture to processors in a hardware architecture. Machine learning system 104 may use a mapping cost function to select a mapping of DNNs in the neural network software architecture to processors in the hardware architecture.

FIG. 12 shows an example mapping of a neural network software architecture to a system architecture. More specifically, machine learning system 104 may map 8-bit CNN 1102 of FIG. 11 to 32-bit floating point CPU 1206 of FIG. 12. The same 8-bit CNN, if mapped to an FPGA, may incur higher computation resources (e.g., higher usage of memory and a FPGA fabric to support floating point computations). Furthermore, in the example of FIG. 12, machine learning system 104 may map 1-bit BNN 1108 to 1-bit FPGA 1208, map 8-bit MLP 1110 to 16-bit CPU 1202, map 32-bit LSTM 1106 to 64-bit floating point GPU 1204, and map 4-bit CNN 1104 to 8-bit DSP 1210. After machine learning system 104 maps a DNN to a processor, the processor may execute the DNN. For instance, in the example of FIG. 12, GPU 1206 may execute CNN 1102.

One aspect in this disclosure revolves around the BitNet training method. For instance, in some examples, the system architecture parameters serve as an input to a BitNet DNN (e.g., DNN 106 (FIG. 1) to select the appropriate neural network software architecture and a mapping of DNNs in the neural network software architecture to processors in a hardware architecture. For example, DNN 106 may be a BitNet DNN that receives a description of a hardware architecture and a description of a problem that a neural network software architecture is designed to solve. In this example, the output of DNN 106 may be an appropriate neural network software architecture for the problem that the neural network software architecture is designed to solve and a mapping of DNNs in the neural network software architecture to processors in the hardware architecture. In this example, DNN 106 may be trained using existing examples of hardware architectures and problem descriptions.

Furthermore, a BitNet DNN's ability to target multiple bit-precisions may allow for more efficient mapping to available hardware resources and may be especially useful for heterogeneous sets of processors. In other words, because a BitNet DNN can be trained such that the weights are represented using more or fewer bits, machine learning system 104 may be able to train multiple versions of the same BitNet DNN based on the same input data but so that the different versions of the same BitNet DNN have different bit depths.

The cost function described in this section can be integrated into the BitNet training algorithm to find a potentially optimal DNN algorithmic performance. For instance, machine learning system 104 may use a modified version of Equation (20), as shown below in Equation (33):

$$l(\tilde{W}) = l(W) + \lambda_1 \sum_{i=1}^{n} q(W^{(i)}, b^{(i)}) + \lambda_2 r(b, P) \quad (33)$$

In the example of Equation (33), P represents a set of hardware parameters for a hardware architecture and r(b, P) is a function, termed a resource function herein, that takes as parameters the precision-optimized bit depths b of the BitNet DNN and also the set of hardware parameters P. In some examples, the resource function r produces higher values when the precision-optimized bit depths in any layer of the BitNet DNN exceeds a limit indicated in the set of hardware parameters P. For instance, the resource function r may be a step function that produces a value of 0 if the bit depths of each layer of the BitNet DNN are below the limit and produces a value of 1 if the bit depth of any layer of the BitNet DNN is above the limit. In another example, the resource function r may produce progressively larger values the more the precision-optimized bit depths exceed the limit. In some examples, the limit is a memory requirement. For instance, in one example, the limit may be on a total amount of memory required for storage of the precision-optimized weights b (e.g., a total amount of memory required for storage of b must be less than 32 kilobytes). In another example, the limit may be on a maximum amount of storage that can be used for storage of precision-optimized weights of a single layer of the BitNet DNN (e.g., no layer can have precision-optimized weights that are each greater than 4 bits). In another example, the resource function r may return a value based on whether the weights are read-boundary aligned. For instance, if a single memory read operation returns 8 bits, two memory read operations may be required to return a 9-bit weight. In this example, the resource function r may return a low value if the precision-optimized weights are read-boundary aligned. Thus, in this example, priority may be put on minimizing the number of read operations and therefore reducing potential energy consumption and delays associated with read operations.

In another example, machine learning system 104 may use the loss function expressed in Equation (34), below.

$$l(\bar{W}) = l(W) + \lambda_1 \sum_{i=1}^{n} q(W^{(i)}, b^{(i)}) + \lambda_2 \sum_{i=1}^{n} 2^{b^{(i)}} + \lambda_3 r(b, P) \quad (34)$$

In Equation (34), $\lambda_3$ is a third hyperparameter and r(b, P) may be defined as above. The loss function of Equation (34) may allow bit depths to be accounted for separately from the hardware parameters P. In other examples, the loss function may include one or more additional factors with additional hyperparameters and additional functions based on b and various hardware factors. In this way, the loss function may be able to take into account various hardware parameters when training a BitNet DNN. Thus, in some examples, the techniques here may allow machine learning system 104 to find the optimal DNN performance given a set of hardware resources, such as the processors and communication links of FIG. 12. Computation during the training phase can also be mapped similarly to the appropriate hardware for testing in the appropriate hardware that supports the selected bit-precision.

The techniques described herein may also be applicable to hardware resources within a processor. For example, in a System-on-Chip (SoC), with multiple processor cores, hardware accelerators, and reconfigurable fabric, the techniques can be used similarly, using system architecture parameters (in this case, they would be related to the SoC) to map a neural network software architecture to SoC resources. In another example, if the system architecture comprises or consists of a bank of FPGAs, machine learning system 104 may use DNN 106 to select the appropriate FPGA resources (e.g., allocating FPGA lookup tables (LUTs) and memory) to obtain the best and optimal DNN performance based on available hardware.

As noted above, FIG. 12 shows an example mapping of a neural network software architecture to system architecture resources. Previously, this disclosure described an AI system that can manage and anticipate its resource needs. In other words, the AI system may anticipate its resource needs by determining which parts of the neural network software architecture would be most efficiently executed on the processors available in a given system architecture. For example, an engineer or computing system may identify a plurality of different scenarios. In some examples, different scenarios may be different system architectures. In some examples, different scenarios may involve the same set of processors but with differences in other parameters, such as available bandwidth, available remaining battery life, remaining allocable memory space, processor workload, and so on. In this example, machine learning system 104 may train multiple versions of the same neural network software architecture using the techniques of this disclosure based on the different scenarios. Thus, each version of the neural network software architecture may be tailored for use with a different anticipated scenario.

In reference to FIG. 12, if one of the hardware resources becomes unavailable (e.g., lost power, network connection lost, etc.) a BitNet training method can be invoked to map the neural network software architecture to a new set of system architecture parameters. Specifically, a new mapping is performed on the neural network software architecture (e.g., neural network software architecture 1100 of FIG. 11) to a new system architecture (e.g., a subset of processors in FIG. 12). For instance, in the example of FIG. 12, if GPU 1206 becomes unavailable, mapping module 122 may deploy on the remaining processors of system architecture 1200 (i.e., hardware architecture) a version of neural network software architecture 1100 tailored for use in the scenario in which GPU 1206 is unavailable. For instance, in the version of neural network software architecture 1100 tailored for use in the scenario in which GPU 1206 is unavailable, CNN 1102 and LSTM 1106 may both be mapped to GPU 1204. One aspect here is the combination of BitNet training with a dynamic set of system architecture parameters. One aspect here is that the cost function for BitNet may be based on a dynamic set of system architecture parameters (e.g., a loss function). In this example, the cost function may be the loss function as described previously as Equation (34), where λ1 and λ2 are set based to optimize one of size, weight, power and cost (SWaPC) of the hardware architecture 1200.

In another example, BitNet training can be used to arrive at multiple neural network software architectures for a set of typical configurations. For example, in reference to FIG. 12, if router 1212 has periodic reductions in bandwidth (e.g., during different period of time when there is network congestion), BitNet may generate two neural network software architectures during training (one that maps a DNN to a system using router 1212, and one that maps the DNN to a system without router 1212). As such, this process is analogous to fat-binaries, in which multiple statically compiled program can be selected at runtime based on dynamic conditions. In our case, the BitNet DNN selects neural network software architectures appropriate to the available hardware. In other words, DNN 106 may select an appropriate previously-prepared neural network software architecture from among a plurality of previously-prepared neural network software architectures. Each DNN in each of the previously-prepared neural network software architecture is already trained.

In reference to machine learning system 104, in a step to anneal the constraints, selected weights are selected based on a joint optimization of DNN performance and hardware resources. In reference to the loss function selection the lambda parameters ($\lambda_1$, $\lambda_2$ and $\lambda_3$) in equation (34) based in hardware parameters P, this disclosure describes hardware parameters P that may be updated during training to affect the selection of the annealing constraints. The selection of hardware parameters P during training allows for a pareto-optimal selection of hardware resources with respect to size, weight, and power, for example. Such approach in dynamic selection of hardware parameters serves as a design tradeoff method for a designer, using the loss function as a joint-optimization of machine learning performance and hardware resource. This disclosure describes a loss function that uses a correspondence between the bit-precision and hardware parameters, with respect to equation (34) and in reference to r(b, P) function. It is understood that the correspondence can be a similar mapping of machine learning hyper parameters (e.g. bit precision, learning rate, DNN depth, fusion layers, activation, learning algorithm) to hardware parameters, to enable a joint-optimization. It is also understood then that the correspondence can be other similar mapping of machine learning parameters to other physical constraints (e.g. environmental, data biases) that influence the DNN training, wherein a joint-optimization can be performed similarly, as in equation (34).

In this section, this disclosure describes an example in a space-borne application. This example uses a spaceborne application because there are strict limitations on available SWaP and communication bandwidth. Small satellites such as cube-sats may only have 10×10×10 cm and 1.33 Kg weight. Cube-sats typically operate as distributed swarms, each with different set of sensors. Each cube-sat may have a different set of processors. There is also a limited power budget, as well as limited communication bandwidth to ground stations and among the cube-sats. In reference to FIG. 12, machine learning system 104 (FIG. 1) may map a neural network software architecture onto a swarm of cube-sats. A BitNet DNN may be used to distribute and map the DNN inference computation among the cube-sats. In this example, if a communication link is lost with a subset of cube-sats, the BitNet DNN can be used to re-train and distribute the DNN computation to the currently available cube-sat hardware. One aspect here is that the BitNet DNN (e.g., DNN 106) may make the distribution of computation and selection of neural network software architecture simultaneously. Because the BitNet DNN can target specific bit-precisions, the BitNet DNN can optimally map other DNNs to system resources. With a changing set of system resources, DNN 106 can dynamically reselect a different neural network software architecture to match available hardware. In another example, the BitNet cost function for mapping can be one of resiliency. Given that the cube-sat network topology may be changing, BitNet DNN 106 can be used to find the optimal network configuration, among the available cube-sat hardware. For example, point-to-point network communication between cube-sats can be made in a way to support the most optimal DNN performance.

AI systems have been demonstrated in a myriad of applications, from search engines to autonomous vehicles. The AI systems may use DNN algorithms that have recently shown outstanding performance in learning intricate relationships in multi-dimensional data. However, current AI systems typically do not have the ability to learn beyond what they were prepared for in advance. In situations where complete details are often unknown in advance, current AI systems are not able to react quickly and adapt to dynamic circumstances. Furthermore, the traditional approach may require taking the system offline for retraining/re-programming. This process may be expensive and time-consuming, not to mention disruptive or infeasible for certain tasks.

Accordingly, it may be advantageous to have an AI system that can continue learning while more or less simultaneously performing inference. More specifically, it may be advantageous for an AI system to support simultaneously learning and inference in an efficient manner (e.g., from a learning perspective, and from a power/performance perspective). Such an AI system may autonomously self-reconfigure on the fly, including adjustment of hyper-parameters such as a learning rate.

This disclosure presents an AI system that may (a) anticipate its learning needs, and (b) may dynamically and proactively manage its operation/resources. The AI system may select or search for optimal DNN parameters without training to full convergence. The techniques here may decouple the training and DNN structure optimization tasks, which may break away from the conventional approach that relies on iterative model selection and training to find a set of hyper-parameters that leads to optimal performance on a given dataset.

The techniques here may be applicable in many areas because the techniques may apply to the basic ability for the AI systems to select its own infrastructure (learning approach, software/hardware, etc.). The techniques may enable AI systems to be adaptive at the edge by providing an approach to tradeoff algorithmic performance and hardware SWaP (size, weight and power). The techniques here may be useful for applications like self-driving car and robots, where the autonomous aspects are enhanced with the ability to self-reconfigure while improving its learning capability. The techniques here may enable powerful DNNs for resource-constrained environments, such as mobile smartphone devices. The techniques here may be a valuable tool in other areas such as cybersecurity, where advance information on the cyber-attack is unknown (and taking the system offline for retraining is not a viable option). The techniques here may be useful for user customization/individualization, where the AI system self-reconfigure based on user inputs.

This disclosure describes a system that senses, learns, and reacts. The system (e.g., DNN 106) gathers inputs from sensors from external environment and internal operations. The sensors may generate various types of data, such as data indicating availability status of processors, up/down states of communication links, availability of electrical energy, temperature, remaining battery power, remaining memory space, need for real-time performance, and so on. The system may then learn from these input sensor data. This disclosure extends the "react" aspects where the system reconfigures itself (algorithm, software, hardware, etc.) based on what it senses and what it learns to do. In this case, the system would (a) anticipate what it needs from a learning perspective, and (b) dynamically and proactively manage its operation/resources to achieve the learning goals. For example, DNN 106 may be implemented as a BitNet DNN that takes hardware parameters as input and outputs a neural network software architecture that includes one or more DNNs mapped to processors of a hardware architecture. The one or more DNNs in the neural network software architecture may themselves be BitNet DNNs. In some examples, the one or more DNNs in the neural network software architecture may be pretrained. In some examples, machine learning system 104 may train one or more of the DNNs in the neural network software architecture to meet requirements of specific processors after DNN 106 selects the neural network software architecture and the mapping. In some examples, DNN 106 may continue to update the neural network software architecture as DNN 106 receives new inputs from the sensors.

There have been systems that can adjust system configuration based on its computing needs and resource constraints (e.g., a processor may adjust operating frequency levels based on available battery power). In accordance with a technique of this disclosure, machine learning system 104 may cause machine learning system 104 to reconfigure DNN 106 based on the selection or search of optimal learning parameters. More specifically, the technique includes the selection of appropriate DNN parameters (e.g., weights), and not just hardware/software parameters (e.g., processor operating frequency, software processing needs, available battery power). With respect to DNN training, the techniques for selecting or searching for optimal DNN parameters may be done without training to full convergence, because in one example, a DNN with lower bit precision can be an alternative neural network that approximates the computation of a higher precision neural network. This technique combines the following: (a) system reconfiguration, (b) selection and optimization of DNN learning parameters, and (c) without fully training the DNN, whereby training can essentially stop when the BitNet trained neural network has reached a predefined performance that approximates a neural network trained with higher bit-precision.

There are a number of options for low SWaP hardware and circuit embodiments for a BitNet trained neural network. For example, in a multicore processor, certain processors or hardware accelerators can be turned on when needed to support different DNN computational needs. For an FPGA, certain circuit fabrics can be turned on (configured) when needed. In another architecture with stacked 3D memories, certain banks of memory can be utilized to provide higher bandwidth to stored parameters. Additional tradeoffs in time/energy associated with storage and movement of data can be configured to support fast gradient evaluations (local and global). Additional circuits (neuromorphic, analog and memristors) can be used. Analog processors can select different bit-precision to address manufacturing variance in advanced nanoelectronics.

In some examples, computing system 100 may enable autonomous changes of its own implementation, optimized for SWaPC (size, weight, power, cost) and effectiveness (throughput, latency, functional optimality). The BitNet DNN techniques of this disclosure may enable lifelong learning with architectural evolution. In some examples, adjustments on both system (hardware and software) and learning (learning rate, DNN depth, fusion layers) may be performed dynamically based on system needs. The hardware may support both on-line learning and near-simultaneously inference, supported by our DNN selection algorithms that do not need to train to convergence. That is, computing system 100 (e.g., using DNN 106) may deterministically select an appropriate neural network software architecture (using selection algorithms described in this disclosure), configure the hardware as appropriate, and continue operating without being taken off-line for training. Much like context switching in the software perspective, this disclosure describes a method for selecting/switching DNN contexts.

Capabilities provided by AI systems, such as computing system 100, may be important for agile systems. New AI systems may adapt to context from different types of data simultaneously (EO, IR, radar, etc.). It may be desirable for these platforms to support on-line training in the field with limited power and size budgets. The techniques here may be especially effective on network structure optimization for diverse, multi-modal data. Agile systems may use learning approaches that are unsupervised and continuous, and as such, techniques of this disclosure may adapt continuously to respond to changing environmental cues. Computing system 100 may address issues on catastrophic learning loss by enabling fast structure (e.g., neural network software architecture) selection and optimization with multi-modal composition of DNNs, e.g., using the previously described approach using dynamic parameters without training to full convergence, as described for FIG. 12.

Such an AI system may also be more resilient to adversarial attack. For instance, computing system 100 may prevent an adversary from learning its AI behavior, by enabling computing system 100 to self-reconfigure its learning approach (e.g., using different hyperparameters in the loss function described in Equation 16 to arrive at a new set of DNN parameters, with different bit-precision and range of values). From a cyber-security perspective, such a learning approach may be resilient to adversarial targeting. The following are example application embodiments for cyber-security:

Causative attacks (e.g., attacks that are missed because they are gradual over time because AI vulnerabilities are introduced during training)—the AI system can change learning method such that AI vulnerabilities are difficult to detect. An adversary may attempt to cause the AI system to classify some set of input incorrectly by manipulating the training data. For instance, if the AI system is used to detect suspicious credit card transactions, an adversary who was planning a theft using a particular type of credit card transaction may manipulate the training data such that the AI system does not recognize the particular type of credit card transaction as suspicious. However, such an attack may be less likely to succeed if there are multiple version of the neural network software architecture and which version of the neural network software architecture is deployed changes.

Exploratory attacks (e.g., rule-based triggers can be inferred with sufficient sampling of system outputs, exploiting vulnerabilities after training)—our AI system can reconfigure to change the underlying response and reward functions (e.g., in a reinforcement learning approach) so that its protective measures are difficult for adversaries to learn. For example, an adversary may be able to predict how an AI system will classify input data by observing a sufficient number of system outputs. In this example, if the AI system is designed to detect suspicious credit card transactions, the adversary may be able to identify a particular type of credit card transaction that the AI system incorrectly classifies as innocuous. Accordingly, in this example, the adversary may be able to start using the particular type of credit card transaction to commit a crime. However, by changing the response and reward functions (e.g., a different versions of a neural network software architecture are deployed as hardware architecture parameters change), it may be significantly more difficult for the adversary to identify sets of input data where the AI system misclassified the input data in a way that is favorable to the adversary.

Evasion attacks (e.g., an attack signal is below detection thresholds, evading by obfuscation)—our AI system can increase detection capability (e.g., changing honeypot location and complexity) to detect enemy.

Poisoning attacks (e.g., attacks in which adversaries corrupt training data which weaken the distribution of input data, which results in misclassification)—the AI system may be resilient to catastrophic forgetting because it does not require the entire DNN to be retrained. Instead, the AI system can reconfigure the neural network software architecture with a new DNN layer (e.g., substitute in a trained DNN into the neural network software architecture) to learn the new training data without changing the previous distributions. For example, computing system 100 may deploy a neural network software architecture containing one or more DNNs that may continue learning based incoming training data. Because the incoming training data may be intentionally corrupted in order to damage the neural network software architecture's ability to correctly classify legitimate input data, computing system 100 may preserve and deploy a previously-trained version of the same neural network software architecture if a poisoning attack causes the deployed neural network software architecture to start misclassifying inputs.

An enabler for the techniques of this disclosure is for the AI system to support system adaptation at machine speed. In other words, the AI system may automatically change with version of the DNN is active in real time (e.g., based on changes to hardware architecture parameters, based on the detection of a cybersecurity threat, and so on.) This may enable more effective detection, learning, and responses at low latency (e.g., sense, learn, react). Furthermore, this may be important for many autonomous systems and cybersecurity systems where detection and countermeasures must be deployed efficiently and quickly.

Figure 13:
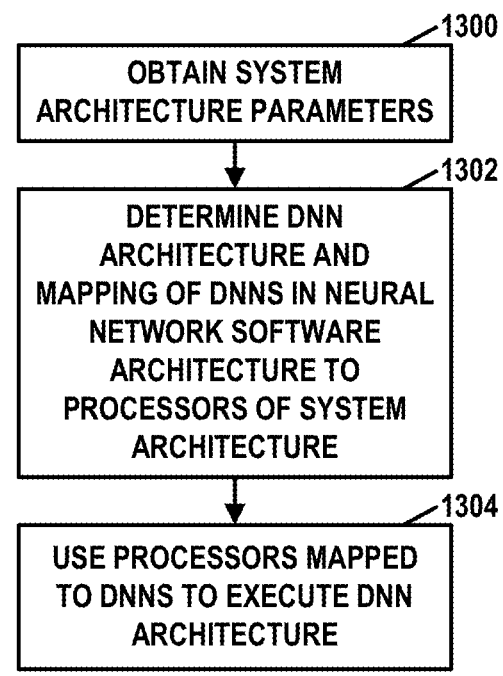
FIG. 13 is a flowchart illustrating an example operation of a machine learning system, in accordance with a technique of this disclosure.

FIG. 13 is a flowchart illustrating an example operation of a machine learning system, in accordance with a technique of this disclosure. In the example of FIG. 13, machine learning system 104 may obtain system architecture parameters (1300). The system architecture parameters may include data describing processors in a system architecture. In some examples, the system architecture parameters include data describing communication links amount processors in the system architecture. Furthermore, in some examples, the system architecture parameters include data indicating current conditions of computing resources in the system architecture. In some examples, machine learning system 104 may obtain the system architecture parameters from machine learning system 104 (FIG. 1).

Furthermore, in the example of FIG. 13, machine learning system 104 may determine, based on the system architecture parameters, a neural network software architecture and a mapping of DNNs in the neural network software architecture to processors of the system architecture (1302). For example, machine learning system 104 may use DNN 106 to determine the neural network software architecture and the mapping based on the system architecture parameters. Thus, a neural network software architecture and a mapping of DNNs in the neural network software architecture to processors of the system architecture is an output of DNN 106. In this example, during training of DNN 106, machine learning system 104 may use a cost function that assigns cost values to potential neural network software architectures and mappings of DNNs based on one or more of size, weight, power and cost, as defined using the system architecture parameters.

To make the process of determining the neural network software architecture more efficient, machine learning system 104 may use pretrained DNNs in the neural network software architecture. In some examples, machine learning system 104 may perform additional training iterations on the pretrained DNNs using different values of hyperparameters (e.g., $\lambda_1$, $\lambda_2$, $\lambda_3$, etc.) in the loss function than were used in generating the pretrained DNNs in order to optimize the pretrained DNNs for the processors of the hardware architecture to which the DNNs are mapped.

Machine learning system 104 may repeat actions (1300) and (1302) multiple times based on different system architecture parameters to determine multiple versions of the neural network software architecture and potentially different mappings of DNNs to processors of system architectures indicated by the system architecture parameters.

In the example of FIG. 13, processors mapped to the DNNs of the neural network software architecture may execute the DNNs of the neural network software architecture (1304). In some examples, the processors may execute the DNNs in an evaluate mode. In some examples, the processor may continue training the DNNs.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A computing system that trains a deep neural network (DNN) for reduced computing resource requirements, the computing system comprising:
   a memory storing a set of weights of the DNN, the DNN including a plurality of layers, wherein for each layer of the plurality of layers,
      the set of weights includes weights of the layer and a set of bit precision values includes a bit precision value of the layer,
      the weights of the layer being represented in the memory using values having bit precisions equal to the bit precision value of the layer,
      the weights of the layer being associated with inputs to neurons of the layer; and
   processing circuitry for executing a machine learning system configured to train the DNN, wherein training the DNN comprises optimizing the set of weights and the set of bit precision values.

2. The computing system of claim 1, wherein the machine learning system is configured such that, as part of training the DNN, the machine learning system:
applies a backpropagation algorithm over a plurality of iterations, wherein each iteration of the backpropagation algorithm updates the set of weights and optimizes the set of bit precision values.

3. The computing system of claim 1, wherein two or more of the layers of the DNN have different bit precision values.

4. The computing system of claim 1, wherein:
the set of weights is a first set of weights,
the memory stores a second set of weights that includes a fixed precision set of weights for each layer in the plurality of layers, each weight in the second set of weights having a bit precision equal to a predefined maximum bit precision value, and
the machine learning system is configured such that, as part of training the DNN, the machine learning system performs a plurality of iterations to train the DNN, wherein the machine learning system is configured such that, as part of performing the plurality of iterations, the machine learning system, for each iteration of the plurality of iterations:
uses the second set of weights as weights of inputs of neurons in the DNN to calculate a first output data set based on a first input data set,
determines a loss function;
updates the second set of weights based on the loss function;
updates the set of bit precision values based on the loss function; and
after updating the second set of weights and after updating the set of bit precision values, updates the first set of weights based on the updated second set of weights and the updated set of bit precision values, and
the machine learning system is further configured to use the first set of weights as the weights of the inputs of the neurons in the DNN to calculate a second output data set based on a second input data set.

5. The computing system of claim 4, wherein the machine learning system is configured such that, as part of determining the loss function, the machine learning system:
determines a first operand, the first operand being an intermediate loss function;
determines a second operand such that the second operand is equal to a multiplication product of a value of a first hyperparameter and a sum of quantization errors for each of the layers in the plurality of layers;
determines a third operand such that the third operand is equal to a multiplication product of the value of a second hyperparameter and $\Sigma_{i=1}^{N} 2^{b^i}$, where i is an index, N is a total number of layers in the plurality of layers, and $b^i$ is the bit precision value for the i'th layer in the plurality of layers; and
determines the loss function as the sum of the first operand, the second operand, and the third operand.

6. The computing system of claim 5, wherein the machine learning system is further configured to:
for each layer of the plurality of layers, determine the quantization errors for the layer based on differences between weights of the layer in the first set of weights and weights of the layer in the second set of weights.

7. The computing system of claim 5, wherein:
the first input data set comprises a batch of training data-label pairs, the machine learning system is configured such that, as part of determining the first operand, the machine learning system determines the first operand such that the first operand is equal to:

$$-\frac{1}{B}\sum_{i=1}^{B} \log(X_{i,y_i}^{(N)})$$

where B is a total number of data-label pairs in the batch of data-label pairs, each label in the batch of data-label pairs is an element in a set of labels that includes B labels, i is an index, log (•) is a logarithm function, N is the total number of layers in the plurality of layers, $y_i$ is the i'th label in the set of labels, and $X_{i,y_i}^{(N)}$ is output of the N'th layer of the plurality of layers when the DNN is given as input the data of the i'th data-label pair of the batch of data-label pairs,
wherein the data-label pairs in the batch of data-label pairs are independent identically distributed data-label pairs.

8. The computing system of claim 4, wherein the machine learning system is configured such that, as part of updating the set of bit precision values, the machine learning system:
determines the updated set of bit precision values such that the updated set of bit precision values is set equal to:

$$b - \mu \cdot \text{sign}\left(\frac{\partial l(\tilde{W})}{\partial b}\right)$$

where b is the set of bit precision values, µ is a learning rate, w̃ is the first set of weights, and $$\frac{\partial l(\tilde{W})}{\partial b}$$

is a partial derivative of the loss function with respect to the set of bit precision values, and sign(•) is a function that returns a sign of an argument of the function unless an absolute value of the argument of the function is less than a predetermined threshold in which case the function returns 0.

9. The computing system of claim 4, wherein the machine learning system is configured such that, as part of updating the second set of weights, the machine learning system:
determines the updated second set of weights such that the updated second set of weights is set equal to:

$$W - \mu \cdot \left(\frac{\partial l(\tilde{W})}{\partial W}\right)$$

where W is the second set of weights, µ is a learning rate, w̃ is the first set of weights, and $$\frac{\partial l(\tilde{W})}{\partial W}$$

is a partial derivative of the loss function with respect to the second set of weights.

10. The computing system of claim 4, wherein the machine learning system is configured such that, as part of updating the first set of weights, the machine learning system:
determines an updated first set of weights such that, for each layer of the plurality of layers, updated precision-optimized weights for the layer are set equal to:

$$\alpha + \delta \times \text{round}\left(\frac{W - \alpha}{\delta}\right)$$

where α is a minimum weight in the fixed precision set of weights for the layer, W is the fixed precision set of weights for the layer, and δ is a total number of fixed steps in a discretized range from the minimum weight in the fixed precision set of weights for the layer to a maximum weight in the fixed precision set of weights for the layer, and round(•) is a rounding function.

11. The computing system of claim 10, wherein δ is equal $$\frac{\beta - \alpha}{2^b},$$

where β is the maximum weight in the fixed precision set of weights for the layer and b is the bit precision value for the layer.

12. The computing system of claim 4, wherein, for each layer of the plurality of layers, the machine learning system is configured to:
determine an updated first parameter for the layer such that the updated first parameter for the layer is set equal to:

$$\theta_1 \leftarrow \theta_1 - \mu \frac{\partial l(\tilde{W})}{\partial \theta_1}$$

where $\theta_1$ is the first parameter for the layer, μ is a learning rate and $$\frac{\partial l(\tilde{W})}{\partial \theta_1}$$

is a partial derivative of the loss function with respect to $\theta_1$;
determine an updated second parameter for the layer such that the updated second parameter for the layer is set equal to:

$$\theta_2 \leftarrow \theta_2 - \mu \frac{\partial l(\tilde{W})}{\partial \theta_2}$$

where $\theta_2$ is the second parameter for the layer, μ is a learning rate and $$\frac{\partial l(\tilde{W})}{\partial \theta_2}$$

is a partial derivative of the loss function with respect to $\theta_2$;
determine a set of quantized values for the layer by rounding values produced by applying a quantization function $\theta_1 + \theta_2 \log_2 |w|$, where w denotes weights in the second set of weights that are associated with the layer;
determine a maximum value in the set of quantized values for the layer and a minimum value in the set of quantized values for the layer; and
set the bit precision values of the layer based on a log base 2 of a range defined by the maximum value in the set of quantized value and the minimum value in the set of quantized values.

13. The computing system of claim 4, wherein, for each weight of the first set of weights, the machine learning system is configured such that, as part of updating the first set of weights, the machine learning system:
determines the weight of the first set of weights to be equal to a sign value multiplied by two to the power of an exponent value, the sign value indicating a sign of a corresponding weight in the second set of weights, and the exponent value being based on a log base 2 of the corresponding weight in the second set of weights.

14. The computing system of claim 1, wherein each weight in the set of weights is equal to a power of 2.

15. The computing system of claim 1, wherein each weight is represented in the memory using integer values having the bit precisions equal to the bit precision value of the layer, an offset value, and a quantization step size value.

16. The computing system of claim 1, wherein the machine learning system is configured to train the DNN based on system architecture parameters that describe a system architecture.

17. The computing system of claim 1, wherein:
the machine learning system is further configured to:
obtain system architecture parameters that include data describing processors in a system architecture; and
determine, based on the system architecture parameters, a neural network software architecture and a mapping of DNNs in the neural network software architecture to processors of the system architecture, the neural network software architecture including the DNN, and
processors of the system architecture mapped to DNNs of the neural network software architecture are configured to execute the DNNs of the neural network software architecture.

18. The computing system of claim 1, wherein:
the set of weights is a first set of weights,
the memory further stores a second set of weights of the DNN and a set of bit precision values,
for each layer of the plurality of layers:
the first set of weights includes first weights of the layer, wherein each weight in the first set of weights is equal to a power of 2,
the second set of weights includes second weights of the layer, wherein the second set of weights of the layer have a higher precision than the first set of weights of the layer,
the first weights of the layer are represented in the memory using values having bit precisions equal to a predefined maximum bit precision value
the first weights of the layer and the second weights of the layer are associated with inputs to neurons of the layer,
the second set of weights includes a fixed precision set of weights for each layer in the plurality of layers as part of training the DNN, the machine learning system performs a plurality of iterations to train the DNN, wherein the machine learning system is configured to, as part of performing the plurality of iterations, for each iteration of the plurality of iterations:
  use the second set of weights as weights of inputs of neurons in the DNN to calculate a first output data set based on a first input data set,
  determine a loss function,
  update the second set of weights based on a first gradient of the loss function to determine the updated second set of weights,
  update the set of bit precision values based on a second gradient of the loss function to determine the updated bit precision values, and
  update the first set of weights based on the updated second set of weights and the updated bit precision values,
  wherein the loss function is defined as a sum of a first operand, a second operand, and a third operand,
  wherein the first operand being is an intermediate loss function, wherein the intermediate loss function captures a mean log-likelihood,
  wherein the second operand is equal to a multiplication product of a value of a first hyperparameter and a distillation loss that indicates a difference between using an output generated by the DNN when the machine learning system runs the DNN on the first input data set using the first set of weights and using the second set of weights, and
  wherein the third operand is equal to a multiplication product of the value of a second hyperparameter and a sum of terms that correspond to respective layers of the plurality of layers, wherein for each respective layer of the plurality of layers, the term corresponding to the respective layer is equal to 2 to the power of the bit precision value for the respective layer; and
the machine learning system is further configured to use the first set of weights as the weights of the inputs of the neurons in the DNN to calculate a second output data set based on a second input data set.

19. A method of training a deep neural network (DNN) for reduced computing resource requirements, the method comprising:
  storing a set of weights of the DNN and a set of bit precision values of the DNN, the DNN including a plurality of layers, wherein for each layer of the plurality of layers, the set of weights includes weights of the layer and the set of bit precision values includes a bit precision value of the layer, the weights of the layer being represented in memory using values having bit precisions equal to the bit precision value of the layer, the weights of the layer being associated with inputs to neurons of the layer; and
  executing a machine learning system configured to train the DNN, wherein training the DNN comprises optimizing the set of weights and the set of bit precision values.

20. The method of claim 19, wherein training the DNN comprises:
  applying a backpropagation algorithm over a plurality of iterations, wherein each iteration of the backpropagation algorithm updates the set of weights and optimizes the set of bit precision values.

21. The method of claim 19, wherein two or more of the layers of the DNN have different bit precisions.

22. The method of claim 19, wherein:
  the set of weights is a first set of weights,
  the method further comprises storing a second set of weights that includes a fixed precision set of weights for each layer in the plurality of layers, each weight in the second set of weights having a bit precision equal to a predefined maximum bit precision value, and
  training the DNN comprises performing a plurality of iterations to train the DNN, wherein performing the plurality of iterations comprises, for each iteration of the plurality of iterations:
    using the second set of weights as weights of inputs of neurons in the DNN to calculate a first output data set based on a first input data set,
    determining a loss function;
    updating the second set of weights based on the loss function;
    updating the set of bit precision values based on the loss function; and
    after updating the second set of weights and after updating the set of bit precision values, updating the first set of weights based on the updated second set of weights and the updated set of bit precision values, and
  the method further comprises using the first set of weights as the weights of the inputs of the neurons in the DNN to calculate a second output data set based on a second input data set.

23. The method of claim 22, wherein determining the loss function comprises:
  determining a first operand, the first operand being an intermediate loss function;
  determining a second operand such that the second operand is equal to a multiplication product of a value of a first hyperparameter and a sum of quantization errors for each of the layers in the plurality of layers;
  determining a third operand such that the third operand is equal to a multiplication product of the value of a second hyperparameter and $\Sigma_{i=1}^{N} 2^{b^i}$, where i is an index, N is a total number of layers in the plurality of layers, and $b^i$ is the bit precision value for the i'th layer in the plurality of layers; and
  determining the loss function as the sum of the first operand, the second operand, and the third operand.

24. The method of claim 23, further comprising:
  for each layer of the plurality of layers, determining the quantization errors for the layer based on differences between weights of the layer in the first set of weights and weights of the layer in the second set of weights.

25. The method of claim 23, wherein:
  the first input data set comprises a batch of training data-label pairs, determining the first operand comprises determining the first operand such that the first operand is equal to:

$$-\frac{1}{B}\sum_{i=1}^{B} \log(X_{i,y_i}^{(N)})$$

where B is a total number of data-label pairs in the batch of data-label pairs, each label in the batch of data-label pairs is an element in a set of labels that includes B labels, i is an index, log (•) is a logarithm function, N is the total number of layers in the plurality of layers, $y_i$ is the i'th label in the set of labels, and $X_{i,y_i}^{(N)}$ is output of the N'th layer of the plurality of layers when the DNN is given as input the data of the i'th data-label pair of the batch of data-label pairs, and wherein the data-label pairs in the batch of data-label pairs are independent identically distributed data-label pairs.

26. The method of claim 22, wherein updating the set of bit precision values comprises:

determining the updated set of bit precision values such that the updated set of bit precision values is set equal to:

$$b - \mu \cdot \text{sign}\left(\frac{\partial l(\tilde{W})}{\partial b}\right)$$

where b is the set of bit precision values, $\mu$ is a learning rate, $\tilde{w}$ is the first set of weights, and $$\frac{\partial l(\tilde{W})}{\partial b}$$

is a partial derivative of the loss function with respect to the set of bit precision values, and sign(•) is a function that returns a sign of an argument of the function unless an absolute value of the argument of the function is less than a predetermined threshold in which case the function returns 0.

27. The method of claim 22, wherein updating the second set of weights comprises:

determining the updated second set of weights such that the updated second set of weights is set equal to:

$$W - \mu \cdot \left(\frac{\partial l(\tilde{W})}{\partial W}\right)$$

where W is the second set of weights, $\mu$ is a learning rate, $\tilde{w}$ is the first set of weights, and $$\frac{\partial l(\tilde{W})}{\partial W}$$

is a partial derivative of the loss function with respect to the second set of weights.

28. The method of claim 22, wherein updating the first set of weights comprises:

determining an updated first set of weights such that, for each layer of the plurality of layers, updated precision-optimized weights for the layer are set equal to:

$$\alpha + \delta \times \text{round}\left(\frac{W - \alpha}{\delta}\right)$$

where $\alpha$ is a minimum weight in the fixed precision set of weights for the layer, W is the fixed precision set of weights for the layer, and $\delta$ is a total number of fixed steps in a discretized range from the minimum weight in the fixed precision set of weights for the layer to a maximum weight in the fixed precision set of weights for the layer, and round(•) is a rounding function.

29. The method of claim 28, wherein $\delta$ is equal $$\frac{\beta - \alpha}{2^b},$$

where $\beta$ is the maximum weight in the fixed precision set of weights for the layer and b is the bit precision value for the layer.

30. The method of claim 22, wherein updating the set of bit precision values comprises, for each layer of the plurality of layers:

determining an updated first parameter for the layer such that the updated first parameter for the layer is set equal to:

$$\theta_1 \leftarrow \theta_1 - \mu \frac{\partial l(\tilde{W})}{\partial \theta_1}$$

where $\theta_1$ is the first parameter for the layer, $\mu$ is a learning rate and $$\frac{\partial l(\tilde{W})}{\partial \theta_1}$$

is a partial derivative of the loss function with respect to $\theta_1$;

determining an updated second parameter for the layer such that the updated second parameter for the layer is set equal to:

$$\theta_2 \leftarrow \theta_2 - \mu \frac{\partial l(\tilde{W})}{\partial \theta_2}$$

where $\theta_2$ is the second parameter for the layer, $\mu$ is a learning rate and $$\frac{\partial l(\tilde{W})}{\partial \theta_2}$$

is a partial derivative of the loss function with respect to $\theta_2$;

determining a set of quantized values for the layer by rounding values produced by applying a quantization function $\theta_1 + \theta_2 \log_2 |w|$, where w denotes weights in the second set of weights that are associated with the layer;

determining a maximum value in the set of quantized values for the layer and a minimum value in the set of quantized values for the layer; and setting the bit precision values of the layer based on a log base 2 of a range defined by the maximum value in the set of quantized value and the minimum value in the set of quantized value.

31. The method of claim 22, wherein updating the first set of weights comprises, for each weight of the first set of weights:

determining the weight of the first set of weights to be equal to a sign value multiplied by two to the power of an exponent value, the sign value indicating a sign of a corresponding weight in the second set of weights, and the exponent value being based on a log base 2 of the corresponding weight in the second set of weights.

32. The method of claim 19, wherein each weight in the set of weights is equal to a power of 2.

33. The method of claim 19, wherein each weight is represented in the memory using integer values having the bit precisions equal to the bit precision value of the layer, an offset value, and a quantization step size value.

34. The method of claim 19, wherein the machine learning system is configured to train the DNN based on system architecture parameters that describe a system architecture.

35. The method of claim 19, further comprising:
   obtaining system architecture parameters that include data describing processors in a system architecture;
   determining, based on the system architecture parameters, a neural network software architecture and a mapping of DNNs in the neural network software architecture to processors of the system architecture, the neural network software architecture including the DNN; and
   executing, by the processors of the system architecture mapped to DNNs of the neural network software architecture, the DNNs of the neural network software architecture.

36. A computer-readable data storage medium having instructions stored thereon that, when executed, cause one or more processors to:
   store, in a memory, a set of weights of a deep neural network (DNN), the DNN including a plurality of layers, wherein for each layer of the plurality of layers, the set of weights includes weights of the layer and a set of bit precision values includes a bit precision value of the layer, the weights of the layer being represented in memory using values having bit precisions equal to the bit precision value of the layer, the weights of the layer being associated with inputs to neurons of the layer; and
   execute a machine learning system configured to train the DNN, wherein training the DNN comprises optimizing the set of weights and the set of bit precision values.

* * * * *

UNITED STATES PATENT AND TRADEMARK OFFICE
CERTIFICATE OF CORRECTION

PATENT NO. : 11,429,862 B2
APPLICATION NO. : 16/133446
DATED : August 30, 2022
INVENTOR(S) : Sek Meng Chai, Aswin Nadamuni Raghavan and Samyak Parajuli It is certified that error appears in the above-identified patent and that said Letters Patent is hereby corrected as shown below:

In the Claims

Column 41, Line 56 (Claim 5): Replace "$\sum_{i=1} {}^N 2^{b^i}$" with -- $\sum_{i=1}^{N} 2^{b^i}$ --

Column 46, Line 40 (Claim 23): Replace "$\sum_{i=1} {}^N 2^{b^i}$" with -- $\sum_{i=1}^{N} 2^{b^i}$ --

Signed and Sealed this
Fifth Day of December, 2023

Katherine Kelly Vidal
*Director of the United States Patent and Trademark Office*